US012233918B2

(12) United States Patent
Tweddle et al.

(10) Patent No.: US 12,233,918 B2
(45) Date of Patent: Feb. 25, 2025

(54) DETERMINING PERCEPTUAL SPATIAL RELEVANCY OF OBJECTS AND ROAD ACTORS FOR AUTOMATED DRIVING

(71) Applicant: FORD GLOBAL TECHNOLOGIES, LLC, Dearborn, MI (US)

(72) Inventors: Brent Tweddle, Falls Church, VA (US); Maen Hammod, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 17/581,568

(22) Filed: Jan. 21, 2022

(65) Prior Publication Data

US 2023/0234617 A1   Jul. 27, 2023

(51) Int. Cl.
*B60W 60/00* (2020.01)
*B60W 30/09* (2012.01)
(Continued)

(52) U.S. Cl.
CPC ...... *B60W 60/00276* (2020.02); *B60W 30/09* (2013.01); *B60W 30/0953* (2013.01);
(Continued)

(58) Field of Classification Search
None
See application file for complete search history.

(56) References Cited

U.S. PATENT DOCUMENTS 7,818,127 B1   10/2010   Duggan et al.
7,848,127 B2   10/2010   Duggan et al.
(Continued)

FOREIGN PATENT DOCUMENTS

EP   3349146 A1   7/2018
EP   3396408 A1   10/2018
(Continued)

OTHER PUBLICATIONS

Xu, W., et al., "Safe Vehicle Trajectory Planning in an Autonomous Decision Support Framework for Emergency Situations," *Applied Sciences*, 2021, 11(14), 6373; https://doi.org/10.3390/app11146373.
(Continued)

*Primary Examiner* — Lail A Kleinman
(74) *Attorney, Agent, or Firm* — Frank A. MacKenzie; Brooks Kushman P.C.

(57) ABSTRACT

Disclosed herein are system, method, and computer program product embodiments for determining objects that are kinematically capable, even if non-compliant with rules-of-the-road, of affecting a trajectory of a vehicle. The computing system (e.g., perception system, etc.) of a vehicle may generate a trajectory for the vehicle and a respective trajectory for each object of a plurality of objects within a field of view (FOV) of the sensing device associated with the vehicle. The computing system may identify objects of the plurality of objects with trajectories that intersect the trajectory for the vehicle and remove from such objects, objects with trajectories that at least one of exit the FOV or intersect with other objects of the plurality of objects within the FOV. The computing system may select, from remaining objects with trajectories that intersect the trajectory for the vehicle, objects with trajectories that indicate a respective collision between the object and the vehicle and assign a severity of the respective collision.

18 Claims, 25 Drawing Sheets

(51) Int. Cl.
*B60W 30/095* (2012.01)
*B60W 50/00* (2006.01)
*B60W 50/14* (2020.01)
*G06V 20/58* (2022.01)
*G08G 1/16* (2006.01)

(52) U.S. Cl.
CPC .... *B60W 30/0956* (2013.01); *B60W 50/0097* (2013.01); *B60W 50/14* (2013.01); *B60W 60/0015* (2020.02); *G06V 20/58* (2022.01); *G08G 1/166* (2013.01); *B60W 2050/146* (2013.01); *B60W 2554/402* (2020.02); *B60W 2554/404* (2020.02)

(56) References Cited

U.S. PATENT DOCUMENTS

| | | | |
|---|---|---|---|
| 8,605,947 | B2 | 12/2013 | Zhang et al. |
| 9,514,378 | B2 | 12/2016 | Armstrong-Crews et al. |
| 9,824,586 | B2 | 11/2017 | Sato et al. |
| 10,054,678 | B2 | 8/2018 | Mei et al. |
| 10,106,156 | B1 * | 10/2018 | Nave ................ B60W 50/0098 |
| 10,220,766 | B2 | 3/2019 | Soehner et al. |
| 10,416,679 | B2 | 9/2019 | Lipson et al. |
| 10,445,599 | B1 | 10/2019 | Hicks |
| 2017/0248693 | A1 | 8/2017 | Kim |
| 2017/0369051 | A1 | 12/2017 | Sakai et al. |
| 2018/0157269 | A1 | 6/2018 | Prasad et al. |
| 2018/0284779 | A1 | 10/2018 | Nix |
| 2018/0299534 | A1 | 10/2018 | LaChapelle et al. |
| 2019/0129009 | A1 | 5/2019 | Eichenholz et al. |
| 2020/0159244 | A1 | 5/2020 | Chen et al. |
| 2021/0035447 | A1 * | 2/2021 | Urano ................ G08G 1/0125 |
| 2021/0347321 | A1 * | 11/2021 | Ustunel ................ G06V 40/103 |
| 2023/0065727 | A1 * | 3/2023 | Yang ................ H04W 4/46 |
| 2023/0154013 | A1 * | 5/2023 | Zink ................ G06T 3/18 |

FOREIGN PATENT DOCUMENTS

| | | |
|---|---|---|
| JP | 2007047972 A | 2/2007 |
| KR | 20180039900 A | 4/2018 |
| KR | 20210004317 A | 1/2021 |
| WO | WO 2010/027795 A1 | 3/2010 |
| WO | 2019180033 A1 | 9/2019 |

OTHER PUBLICATIONS

Luo, Y., et al., "GAMMA: A General Agent Motion Prediction Model for Autonomous Driving," Jun. 4, 2019, arXiv preprint arXiv:1906.01566.

Yu, J., & Petnga, L., "Space-based Collision Avoidance Framework for Autonomous Vehicles," *Procedia Computer Science*, 2018, 140, 37-35; https://doi.org/10.1016/j.procs 2018.10.290.

International Search Report mailed May 11, 2023 of PCT/US2023/060864, 4 pages.

Written Opinion dated May 11, 2023 of PCT/US2023/060864, 5 pages.

International Preliminary Report on Patentability issued Jul. 23, 2024, 6 pages.

* cited by examiner

DETERMINING PERCEPTUAL SPATIAL RELEVANCY OF OBJECTS AND ROAD ACTORS FOR AUTOMATED DRIVING

BACKGROUND

The perception system (e.g., computational system, inference system, etc.) for automated vehicles (AVs) typically outputs all of the tracks (e.g., tracking information for objects and/or actors, etc.) it can observe and detect. As such, the perception system for AVs conventionally outputs significantly more tracks than those that will interact with the planned trajectory of the AVs, and far more than any human driver gives attention to and/or focuses on during a driving task. However, there are certain tracks, such as tracks associated with objects and/or actors that potentially (e.g., in outlying and/or non-compliant situations, etc.) could reach/intersect the AV's path, which the perception system for an AV must execute near-perfect perception performance to avoid damaging and/or potentially life-threatening collisions with the AV. Perception systems that output significantly more tracks than the tracks that may potentially interact with the planned trajectory of AVs unnecessarily tax the computational resources (e.g., on-board computers, etc.) of the associated AVs, and routinely fail to identify the subset of tracks for which near-perfect perception performance is required to avoid collisions.

SUMMARY

A computer-based system, for example, a perception system of an automated vehicle (AV), may generate a trajectory for the AV. For example, based on a planned route and sensor information received from a sensing device associated with the AV, the perception system may generate and/or determine a trajectory for the AV and predict and/or determine a respective trajectory for each object of a plurality of objects within a field of view (FOV) of the sensing device and/or relative to the AV. According to some aspects, the perception system may identify objects of the plurality of objects with trajectories that intersect the trajectory for the vehicle, for example, based on the respective trajectories for each object of the plurality of objects. According to some aspects, the perception system may remove, from the objects with trajectories that intersect the trajectory for the vehicle, objects with trajectories that at least one intersect with other objects of the plurality of objects within the FOV or are kinematic unfeasible to collide with the vehicle. According to some aspects, the perception system may select, from remaining objects with trajectories that intersect the trajectory for the vehicle, objects with trajectories that indicate a respective collision between the object and the vehicle. According to some aspects, the perception system may assign, for each object of the objects with the trajectories that indicate the respective collision between the object and the vehicle, a severity of the respective collision.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
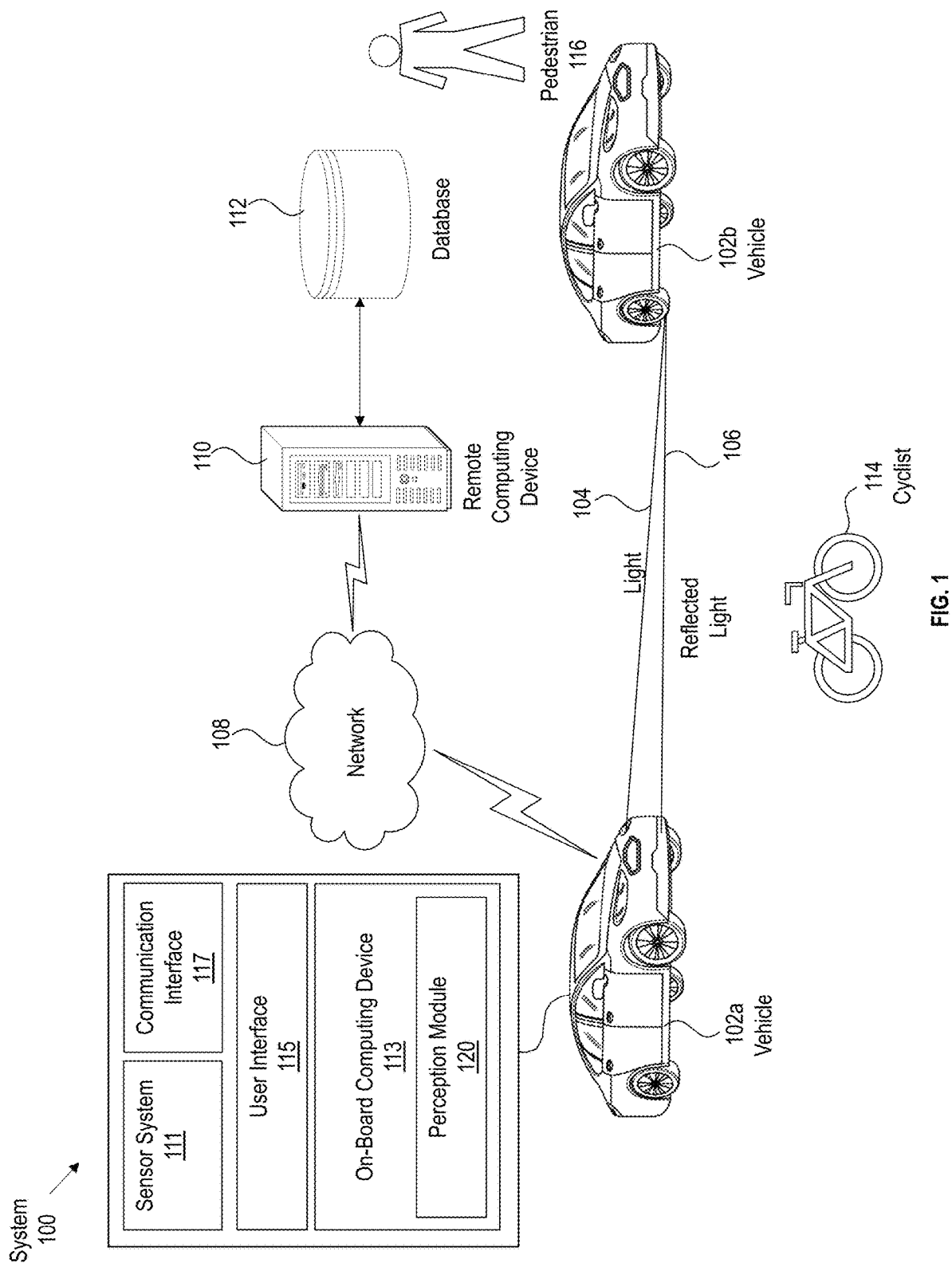
FIG. 1 shows an example autonomous vehicle system, in accordance with aspects of the disclosure.

Provided herein are system, apparatus, device, method, and/or computer program product embodiments, and/or combinations and sub-combinations thereof, for determining objects that are kinematically capable, even if non-compliant with rules-of-the-road, of affecting a trajectory of a vehicle. According to some aspects, the perception system (e.g., computational system, inference system, etc.) of an autonomous vehicle (AV) and/or the like may determine if an object and/or road actor, such as a vehicle, a person, an animal, and/or any item (e.g., a static item, a moving item, etc.) is both detectable and has a kinematically feasible trajectory (even if non-compliant with the standard rules of the road) that allows it to reach the AV's route. For example, the perception system may receive data/information regarding objects and/or actors within a field of view of one or more sensors (e.g., Light Detection and Ranging (lidar) sensors, ultrasonic sensors, depth-sensing devices, Radio Detection and Ranging (RADAR) devices, cameras, etc.)

associated with the AV, and may use a detectability metric to determine, based on the amount (e.g., percentage, etc.) of each object and/or actor that is occluded, whether the object and/or actor is detectable. According to some aspects, the perception system, for objects and/or actors determined to be detectable, may determine an approximation to the AV's trajectory (e.g., a likely and/or intended path of the AV, etc.) based on a current route and velocity of the AV.

The system, apparatus, device, method, and/or computer program product embodiments, and/or combinations and sub-combinations thereof, for determining perceptual relevancy of objects and/or road actors provide improvements over conventional systems (e.g., AV perception systems, etc.). For example, conventional AV perception systems are unable to determine tracks associated with objects and/or actors that could potentially collide with an AV without unnecessarily taxing the computational resources of the AV by outputting significantly more tracks than the tracks that will interact with the planned trajectory of the AV. Conventional AV perception systems are unable to filter datasets for perception verification in such a way that it accelerates the testing of the long tails (e.g., outlier circumstances that could affect the trajectory of an AV, etc.) and avoids instances of false positives (e.g., perception instances that may cause an AV to act on irrelevant objects, etc.) and false negatives (e.g., instances where the perception system misses objects and/or misclassify objects/actors that are critical for the planning and control systems, of an AV, etc.). As such, conventional AV perception systems routinely fail to identify tracks (e.g., tracking information for objects and/or actors, etc.) for which near-perfect perception performance is required to avoid collisions.

The system, apparatus, device, method, and/or computer program product embodiments, and/or combinations and sub-combinations thereof, enable detection of objects that are kinematically capable, even if non-compliant with rules-of-the-road, of affecting a trajectory of a vehicle by enabling datasets that indicate spatially relevant objects (SRO) that are perceived by the perception system of an AV to be generated. According to some aspects, a severity ranking may be assigned to the SROs to enable the perception system to accelerate the testing of long tails and provide data/information that may be used to avoid damaging and/or potentially life-threatening collisions between the AV and SROs. Accelerated generation of datasets that indicate SROs may be used to prioritize scarce computational resources of the on-board computer and/or the like of an AV, as well as selecting objects and road actors that should be included in machine learning (ML) training datasets (e.g., ML datasets used to improve, optimize, and/or access failures of a perception pipeline used in the production of AVs, etc.). These and other technological advantages are described herein.

As used herein, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and/or the like. An "autonomous vehicle" (or "AV") is a vehicle having a processor, programming instructions, and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle, or that a human operator may primarily drive the vehicle and an autonomous system may monitor the operations of the vehicle and take control of vehicle operations to avoid collisions.

Notably, the methods and systems for determining the perceptual relevancy of objects and/or road actors are being described herein in the context of an autonomous vehicle. However, the methods and systems are not limited to autonomous vehicle applications. The methods and systems described herein may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, a watercraft, and/or the like.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116. According to some aspects, as described further herein, the AV 102a (e.g., via on-board computing device 113, etc.) may identify and/or determine whether the objects 102b, 114, 116 are spatially relevant to the AV 102a. A spatially relevant road actor (e.g., object within proximity to the AV 102a) may be defined as any road actor (RA) that could reach an intended trajectory and/or path the AV 102a using a kinematically feasible trajectory (without regard to road and/or traffic rule compliancy. The degree of spatial relevancy for road actors such as the objects 102b, 114, 116 may be classified and/or ranked, for example, according to the severity of a collision that could occur between the road actors and the AV 102a.

As illustrated in FIG. 1, the AV 102a may include a sensor system 111, an on-board computing device 113, a communications interface 117, and a user interface 115. The AV 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
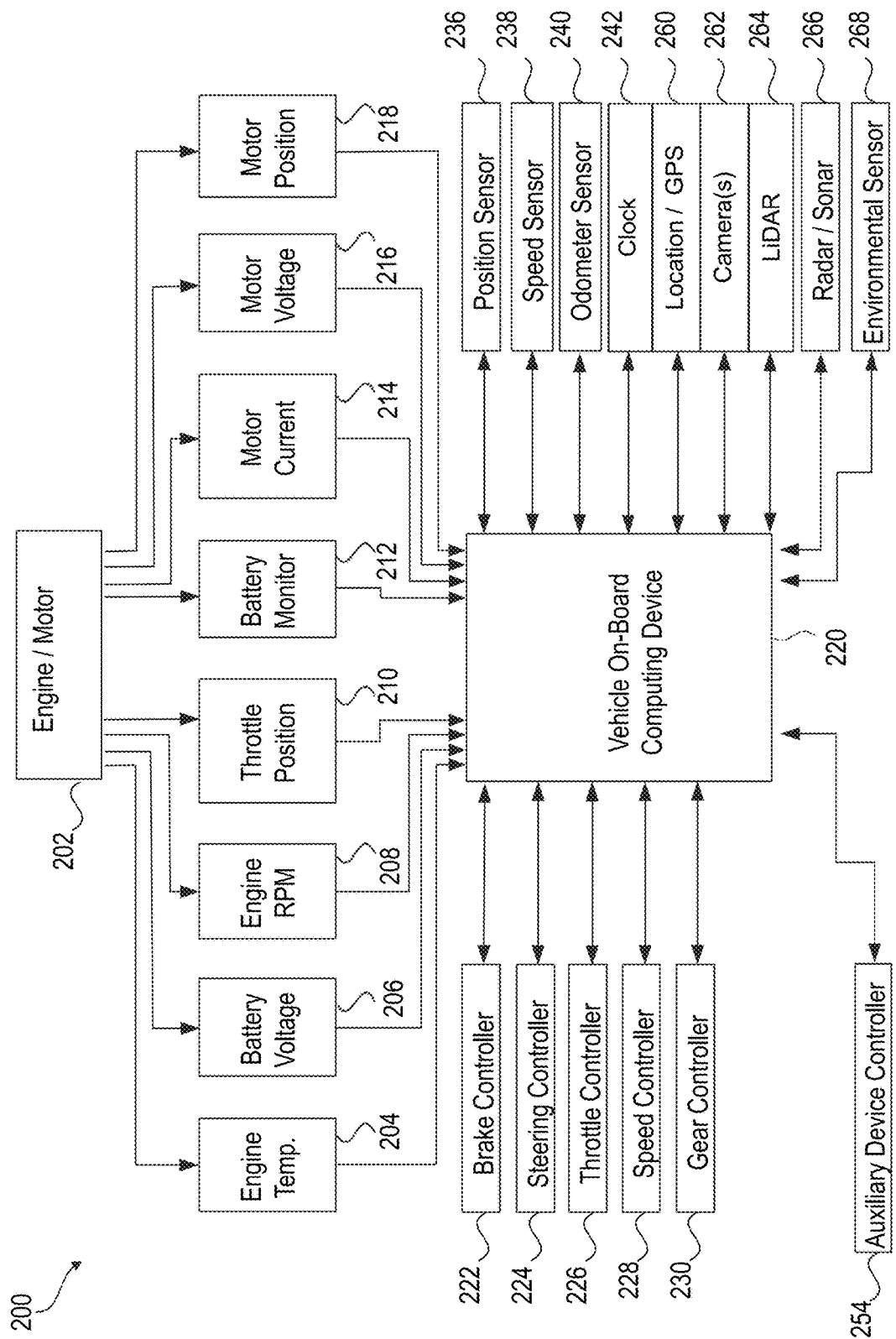
FIG. 2 shows an example architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG.

2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, an XG network, any other type of next-generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Although only a single database 112 is shown, the database 112 may include any number of databases, data repositories, data lakes, third-party data sources, and/or the like. Database 112 may be configured to store and supply raw data, indexed data, structured data, map data, program instructions, or other configurations as are known. For example, the database 112 may provide remote computing device 110 with ground truth data/information, such as JavaScript Object Notation (JSON) files and/or the like that contain labels (e.g. road actor classification information) for road actors (e.g., objects 102b, 114, 116, etc.), SE3 (e.g., proper rigid transformations in 3-dimensional Euclidean space) transformations to AV frame, velocity/speed information, bounding cuboids, and/or the like. The remote computing device 110 may provide the ground truth data/information to the AV 102a (e.g., to the on-board computing device 113 via the communication interface 117, etc.). The remote computing device 110 may provide the AV 102a vector maps (e.g., SQLite files, etc.) corresponding to the ground truth data/information that may be used to extract information about a drivable area, lane segments that belong route travels by the AV 102a, lane segments speed, and/or any other traffic and/or driving area related information. The remote computing device 110 may provide the AV 102a with parameters such as max long acceleration/deceleration, maximum centripetal accelerations, and/or minimal turning radii for the AV 102a and/or road actors (e.g., objects 102b, 114, 116, etc.).

The communications interface 117 may be configured to allow communication between AV 102a and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, a speaker, etc.

FIG. 2 illustrates an example system architecture 200 for a vehicle, in accordance with aspects of the disclosure. Vehicles 102a and/or 102b of FIG. 1 can have the same or similar system architecture as shown in FIG. 2. Thus, the following discussion of system architecture 200 is sufficient for understanding vehicle(s) 102a, 102b of FIG. 1. However, other types of vehicles are considered within the scope of the technology described herein and may contain more or fewer elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors, and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is electric or hybrid, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 (e.g., the on-board computing device 113 of FIG. 1, etc.) may be implemented using the computer system 1600 of FIG. 16. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

According to some aspects, the on-board computing device 220 may receive information from multiple sensors that are used to determine and/or provide pose related information, such as an inertial measurement unit (IMU) (not shown), the speed sensor 238, the location sensor 260, and the on-board computing device 220 may fuse (e.g., via one or more algorithms, etc.) the information from the multiple sensors and compare the fused information with lidar information high-definition map information.

Lidar information is communicated from lidar system 264 (e.g., the sensor system 111 of FIG. 1, etc.) to the on-board computing device 220. Additionally, captured images are communicated from the camera(s) 262 (e.g., the sensor system 111 of FIG. 1, etc.) to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store (e.g., the database 112 of FIG. 1, a local storage of the on-board computing device 220, etc.) to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost functions during the route, and may further access the traffic information and/or estimates that can affect an amount of time it will take to travel on a particular route. According to some aspects, the routing controller 231 can determine routes that avoid certain areas, such as keep out zones (KOZ), and/or the like. According to some aspects, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user (e.g., via the user interface 115 of FIG. 1, etc.) from among various possible routes.

According to some aspects, the on-board computing device 220 may determine perception information of the surrounding environment of the AV 102*a*. Based on the sensor data provided by one or more sensors and location information that is obtained, the on-board computing device 220 may determine perception information of the surrounding environment of the AV 102*a*. The perception information may represent what an ordinary driver would perceive in the surrounding environment of a vehicle. The perception data may include information relating to one or more objects in the environment of the AV 102*a*. For example, the on-board computing device 220 may process sensor data (e.g., lidar or radar data, camera images, etc.) in order to identify objects and/or features in the environment of AV 102*a*. The objects may include traffic signals, roadway boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

According to some aspects, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102*a*, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

According to some aspects, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

According to some aspects, the on-board computing device 220 may receive predictions and decide how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Returning to FIG. 1, as described in FIG. 2, the on-board computing device 113 (e.g., the on-board computing device 220 of FIG. 2) may determine perception information of the surrounding environment of the AV 102a. For example, according to some aspects, the on-board computing device 113 may include a perception module 120. The sensor system 111 may provide the perception module 120 sensor and/or sensor-related data/information, and the on-board computing device 113 may provide the perception module 120 vehicle control and operation information. For example, the sensor system 111 may provide the perception module 120 with data logs, such as log slices, that describe all data collected by the sensor system 111 with predefined time intervals (e.g., 16-second intervals, etc.). The on-board computing device 113 may provide the perception module 120 with data logs, such as log slices, that describe all data collected by on-board computing device 113 with predefined time intervals (e.g., 16-second intervals, etc.). For example, data logs may include data/information such as route response messages, route progress messages, sensor information (e.g., lidar information, etc.), autonomous vehicle pose information (e.g., orientation information, pose, etc.), and/or the like pertaining to the AV 102a and/or road actors (e.g., objects 102b, 114, 116, etc.). The perception module 120 may use data/information from components of the system 100, such as sensor and/or sensor-related data/information from the sensor system 111, vehicle control and operation information from the on-board computing device 113, and raw data, indexed data, structured data, map data, and/or program instructions from the database 112 to identify and/or determine objects (e.g., spatially relevant objects, etc.) affecting a trajectory of the AV 102a.

According to some aspects, the perception module 120 may include a multi-layered architecture and/or data infrastructure configured to identify and/or determine and/or road actors affecting a trajectory of the AV 102a based on the perceptual relevancy of the objects and/or road actors. For example, the perception module 120 may include a data pre-processing layer, a computational layer, and a visualization layer.

According to some aspects, the data pre-processing layer of the perception module 120 may be configured to collect and/or prepare all data/information received by the perception module 120 to be used by the computational layer to determine objects (e.g., spatially relevant objects/road actors, etc.) affecting a trajectory of the AV 102a. According to some aspects, the data pre-processing layer may be used to load, associate, and/or map labels to data structures (e.g., data structures that indicate the AV 102a, road actors, and/or objects sensed by the sensing system 111, etc.). For example, each log slice received by the data pre-processing layer may be associated with a label file (e.g., ground truth data/information, a BlinkyGroundTruth.json, etc.). The data pre-processing layer may receive label files from the database 112 and/or the like, load and parse the label files, and extract information such a time of validity (TOV), amodal cuboid, shrinkwrapped cuboid (e.g., a cuboid that is tightly fit to returned lidar points and therefore does not include any occluded portions of the vehicle, etc.), and velocity/speed for any tracked object. For example, the data pre-processing layer may create a TOV reference list from Lidar sweep messages received from the sensor system 111.

According to some aspects, the data pre-processing layer may determine timing labels for tracks based on the TOV of the lidar sweep messages. The data pre-processing layer may execute a function that reads lidar sweep messages, extracts the TOV, and constructs a list of integer values. The list of integer values may be compared, by the calculation layer of the perception module 120 when determining objects (e.g., spatially relevant objects/road actors, etc.) affecting a trajectory of the AV 102a, to the TOV of a track to determine if the track is visible and/or labeled in a given frame or not.

According to some aspects, the data pre-processing layer may automatically perform interpolation to determine the location and speed (or velocity) of the AV 102a. According to some aspects, the data pre-processing layer may be configured with a function that reads the pose messages from each log slice and use the pose messages to create a command that may be used by the output and visualization layer to generate a pose output and/or representation of the AV 102a. For example, the data pre-processing layer may determine the speed of the AV 102a at a specific TOV and execute a function at the specific TOV using SE3 transformations to AV frame data/information to generate a pose output and/or representation of the AV 102a.

According to some aspects, the data pre-processing layer may determine and/or extract a route for the AV 102a from received log slices. For example, the data pre-processing layer may execute a function that extracts route messages from each log slice. A route message may include lane segments, denoted by universally unique identifiers (UUIDs), associated with a drivable area (e.g., for where the AV 102*a* is supposed to go, etc.), such as along a route traveled by the AV 102*a*. According to some aspects, within historic (old) logs where a route response message does not exist, the function may read a route progress message to extract the lane segments traveled by the AV 102*a*, and then extend the list through the lane segment successors up to a predefined constant.

According to some aspects, the data pre-processing layer may prepare vector map data that may be used to determine objects (e.g., spatially relevant objects, etc.) affecting a trajectory of the AV 102*a*. Each log may correspond to a specific map version, the data pre-processing layer may determine and/or read vector map data/information (e.g., via a vector map layer, etc.) for the specific map from one or more interfaces provided by the remote computing device 110. For example, the data pre-processing layer may execute a function and/or logic that causes the data pre-processing layer to determine and/or read vector map data/information for a specific map from one or more interfaces provided by the remote computing device 110. Execution of a function and/or logic may load lane segment data/information, such as a lane segment list, etc., and generate a drivable area around the route of the AV 102*a*. The function also executes a union operation on the route lane segments to generate a map corridor with a computed centerline path. The centerline is assumed the path of the AV 102*a* and simulated longitudinal acceleration/deceleration trajectories can be interpolated to the centerline, for example, by the computational layer of the perception module 120. An algorithm for generating a map corridor with a computed centerline path is shown in Algorithm 1 below.

Figure 3A:
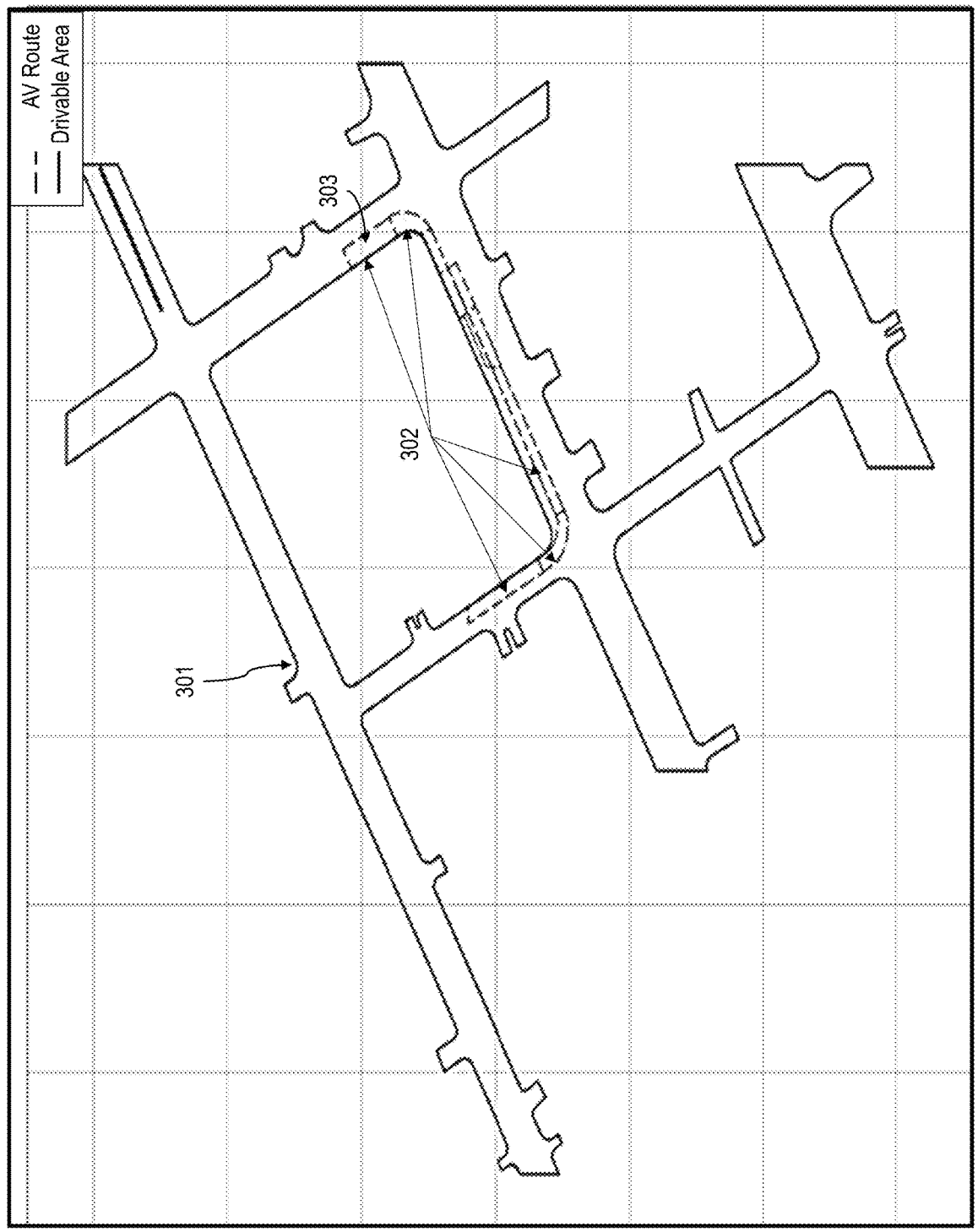
FIG. 3A-3B show example results of a process for determining a centerline of an AV's planned route corridor, in accordance with aspects of the disclosure.
Figure 3B:
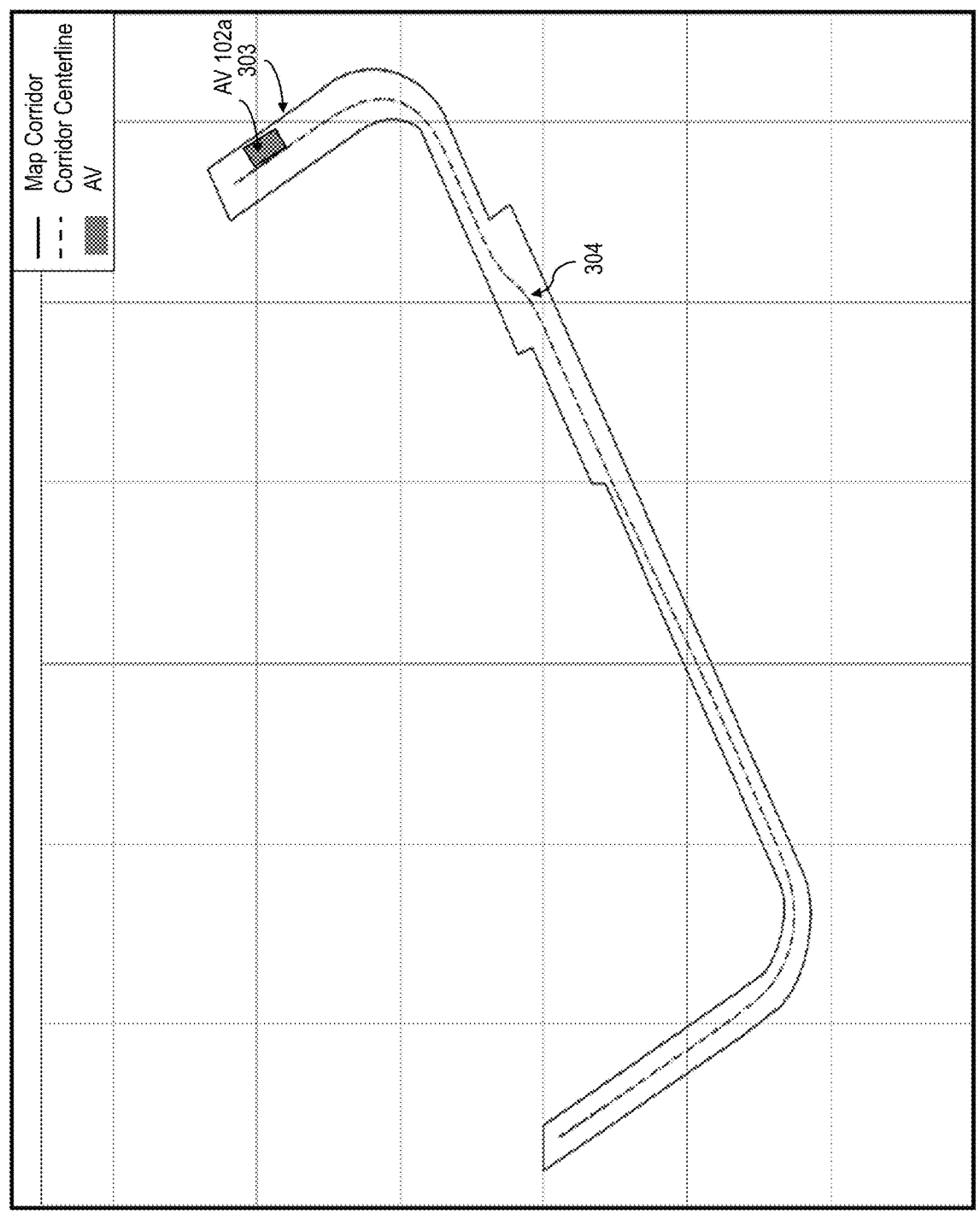

Algorithm 1
  Input: lane segments that belong to the AV route
  Output: centerline of the AV route
  Steps:
    1. Create Av_route polygon using shapely union operation of on all input lane_segements
    2. Extract the exterior points of the av_route polygon
    3. For each point in the list-sort it to either left point or right point
    4. Create a centerline by triangulation between the left and right points then add the midpoint to the map_corridor_cl_list to be returned
    5. Compute the heading for each lane segment FIG. 3A is an example result of Algorithm 1. FIG. 3A may be output by the visualization layer of the perception module 120. FIG. 3A depicts an extracted drivable area 301 and lane segments 302 belonging to a route 303 of the AV 102*a*. FIG. 3B is an example output of Algorithm 1. FIG. 3B may be output by the visualization layer. FIG. 3B depicts a map corridor and extracted centerline. According to some aspects, FIG. 3B depicts predicted lane changes 304 associated with the route 303 (A person of ordinary skill would appreciate that the AV 102*a* could perform a different maneuver for lane change and that FIG. 3B provides a reasonable approximation).

Returning to FIG. 1, according to some aspects, the data pre-processing layer may extract lidar extrinsic data/inform from data logs (e.g., log slices, etc.) received from the sensor system 111. SE3 transformations to AV frame data/information may be used by the calculation layer of the perception module 120 to calculate the detectability of road actors and transform a 3-dimensional cuboid representing the frame of the AV 102*a* to a lidar frame. The data pre-processing layer may execute a function that reads rotation and translation matrices from a JSON file and/or the like from the log directory via an interface and/or the like.

According to some aspects, the calculation layer of the perception module 120 may compute motion profiles for the AV 102*a*. For example, the calculation layer of the perception module 120 may compute motion profiles for the AV 102*a* by executing a spatially relevant object (SRO) algorithm and/or the like for each TOV reference list entry (e.g., per frame, etc.). According to some aspects, the calculation layer may determine an acceleration profile for the AV 102*a*. The calculation layer may execute trajectory optimization functions to calculate a longitudinal trajectory between a current speed of the AV 102*a* extracted from the pose interface and a target speed of lane segment speed. According to some aspects, if the target speed is reached before a 4-second interval, the longitudinal trajectory may be extended at a constant speed. According to some aspects, if the target speed is reached after a 4-second interval the trajectory may be cropped to four-second.

According to some aspects, the calculation layer may determine a deceleration profile for the AV 102*a*. The calculation layer may execute trajectory optimization functions to calculate a longitudinal trajectory between a current speed of the AV 102*a* extracted from the pose interface and a target speed of zero. The trajectory optimization functions provide an optimal longitudinal trajectory for the AV 102*a* to achieve a final condition (e.g., target speed, pose, acceleration, etc.) from initial conditions (e.g., initial speed, pose, acceleration, etc.) within constraints (e.g., max allowed acceleration, deceleration, max allowed Jerk, etc.). According to some aspects, if the target speed is reached before a 4-second interval, the longitudinal trajectory may be extended at 0 speed (in place) until the 4-second interval. According to some aspects, if the target speed is reached after a 4-second interval the trajectory may be cropped to four-second.

Figure 3C:
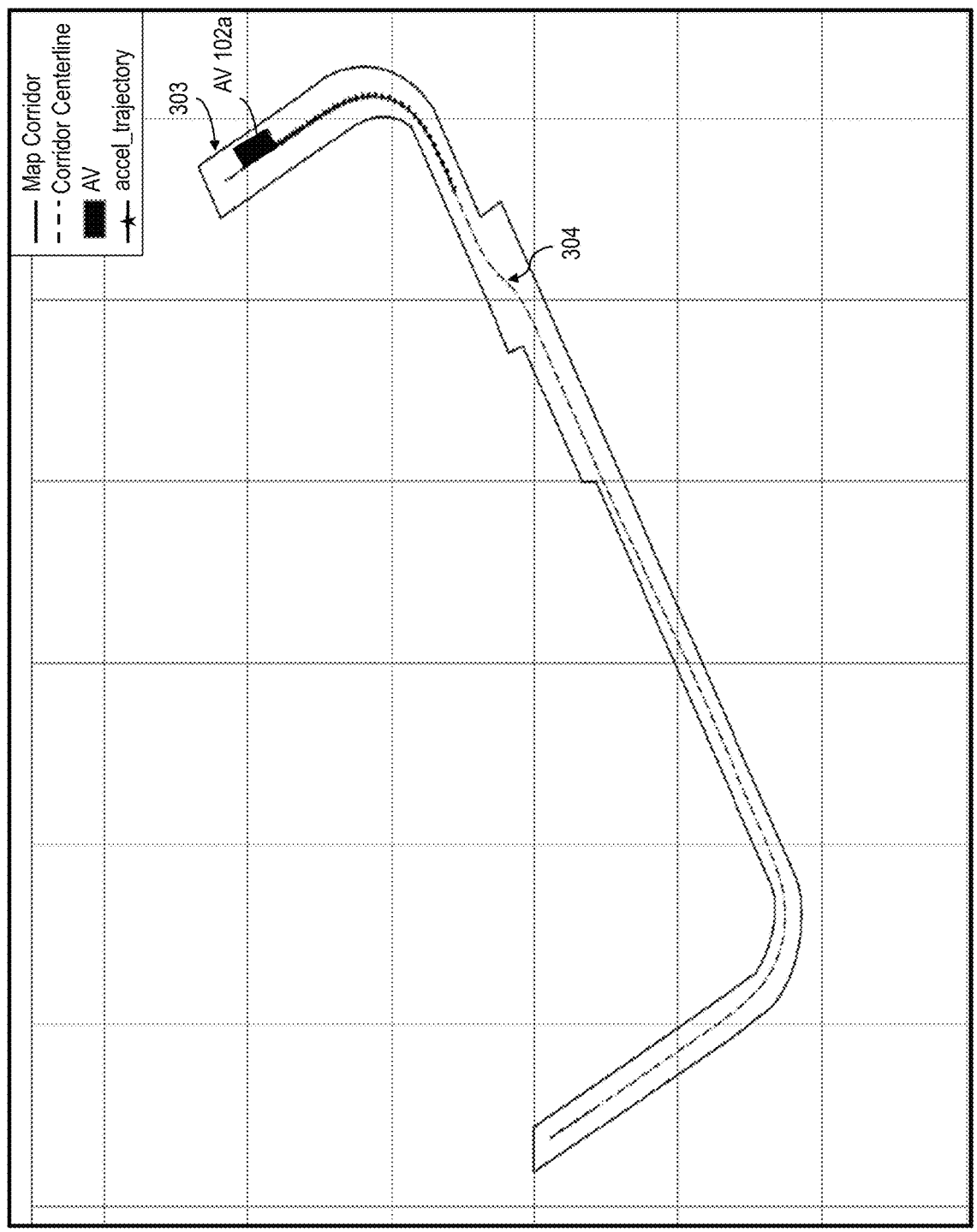
FIG. 3C shows an example of a longitudinal acceleration trajectory projected to a centerline, in accordance with aspects of the disclosure.

For each of the motion profiles (e.g., the acceleration motion profile, the deceleration motion profile, etc.), the longitudinal acceleration trajectory is projected/interpolated on the map corridor centerline starting from the closest point of the pose of the Av 102A at THE current TOV. The calculation layer may sample trajectory, for example, at 10 HZ. The calculation layer may use information from the two motion trajectories to calculate isotemporal regions and collision severity when determining the severity of a road actor. FIG. 3C shows an example of the longitudinal acceleration trajectory projected to the centerline determined from Algorithm 1. FIG. 3C may be output by the visualization layer.

According to some aspects, the calculation layer of the perception module 120 may determine and/or compute isotemporal regions for the AV 102*a*. It will be appreciated that although the route of the AV 102*a* is determined (and depicted) at the lane segments level, the route could be very wide and the AV 102*a* might occupy any space of that route (note that in FIG. 3C the AV 102*a* does not follow the centerline 304). It will be appreciated that when determining objects (e.g., spatially relevant objects, etc.) affecting a trajectory of the AV 102*a*, the perception module 120 may consider the whole map corridor (e.g., route 303, etc.). To reduce the use of the computational resources of the on-board computer 113, when determining objects (e.g., spatially relevant objects, etc.) affecting a trajectory of the AV 102*a*, the perception module 120 may discretize the motion profile for the AV 102*a* along the map corridor at (e.g., the route 303, etc.) one-second intervals. The resulting polygons are called isotemporal polygons.

Figure 3D:
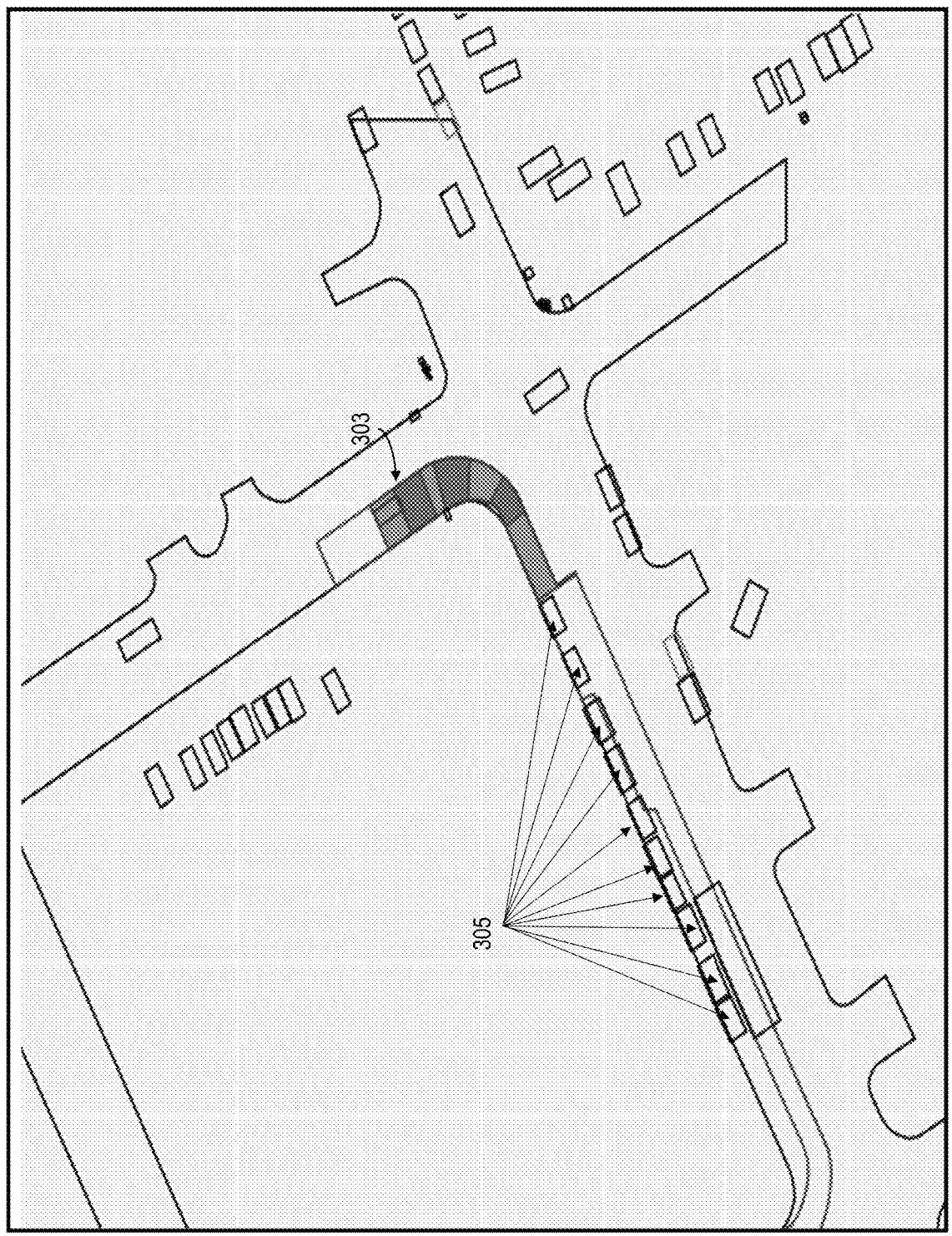
FIG. 3D shows an example of isotemporal regions for an acceleration trajectory, in accordance with aspects of the disclosure.

According to some aspects, to determine isotemporal regions for the Av 102A, the perception module 120 may use a map corridor (e.g., the route 303, etc.) centerline heading to draw perpendicular lines at set and/or defined intervals (e.g., one-second intervals, etc.), intersecting points between these lines with the left and right boundary lines of the map corridor to create the isotemporal region for the acceleration or deceleration profiles of the AV 102*a*. It will be appreciated that the isotemporal regions may overlap with each other as the AV 102*a* has non-zero width and length. FIG. 3D shows an example of isotemporal regions 305 for the acceleration trajectory of the AV 102*a*. FIG. 3D may be output by the visualization layer.

As previously described herein, the perception module 120 may access and/or receive ground truth information (e.g., a ground truth data file, etc.), for example, from the remote computing device 110 and/or the like that includes labels for road actors that are partially occluded. To ensure that the perception module 120 is not penalized for not tracking occluded road actors above certain thresholds, the computational layer may compute a detectability value (e.g., an occlusion percentage, etc.) and perform a thresholding operation to determine if road actors and/or objects, such as the objects 102*b*, 114, 116, are detectable or not. The computational layer may perform a detectability based on a detectability algorithm. For example, an algorithm for determining if an object and/or road actor is detectable is shown in Algorithm 2 below.

Figure 4A:
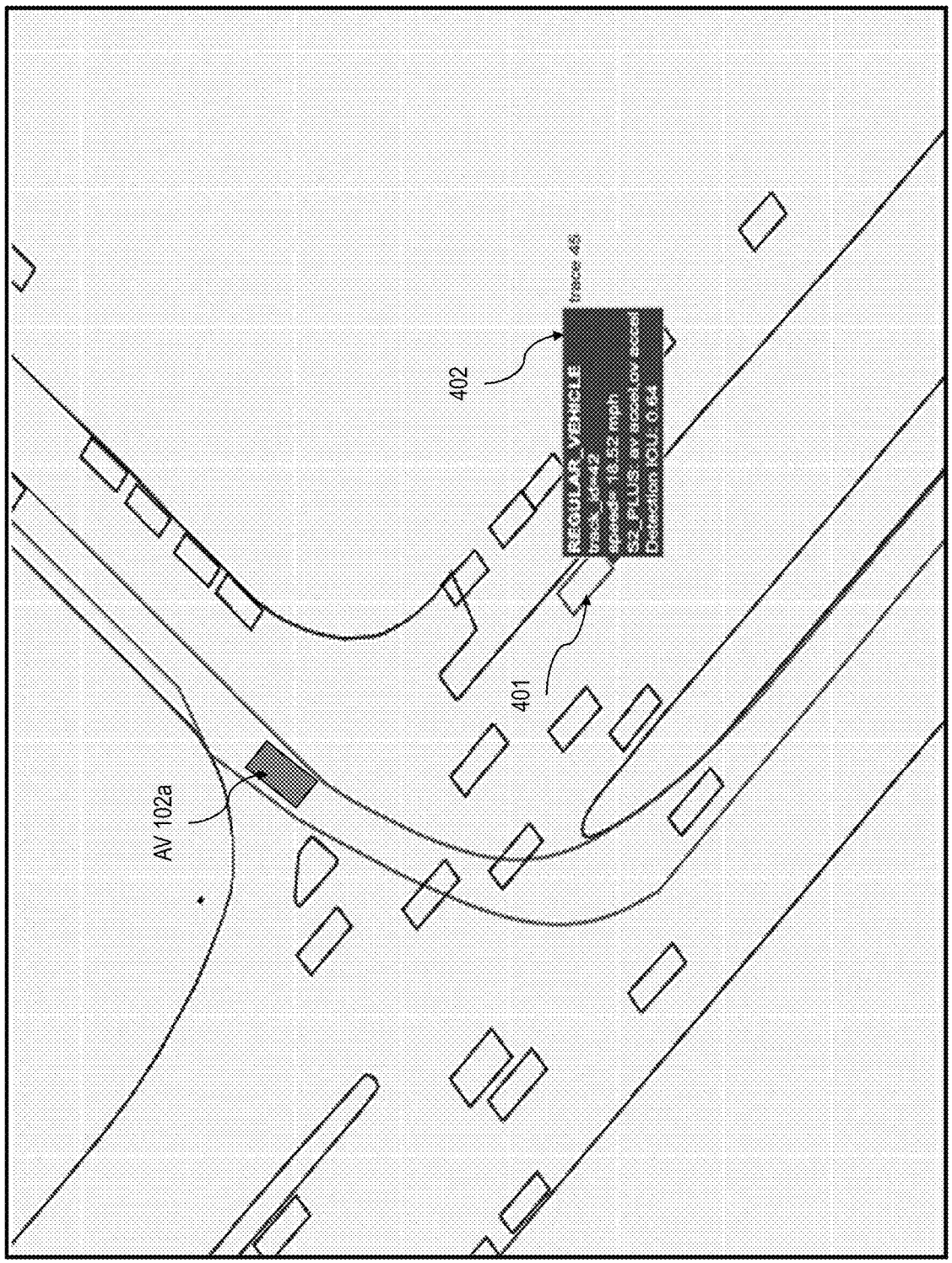
FIGS. 4A-4C show example outputs of steps for determining detectability of road actors, in accordance with aspects of the disclosure.
Figure 4B:
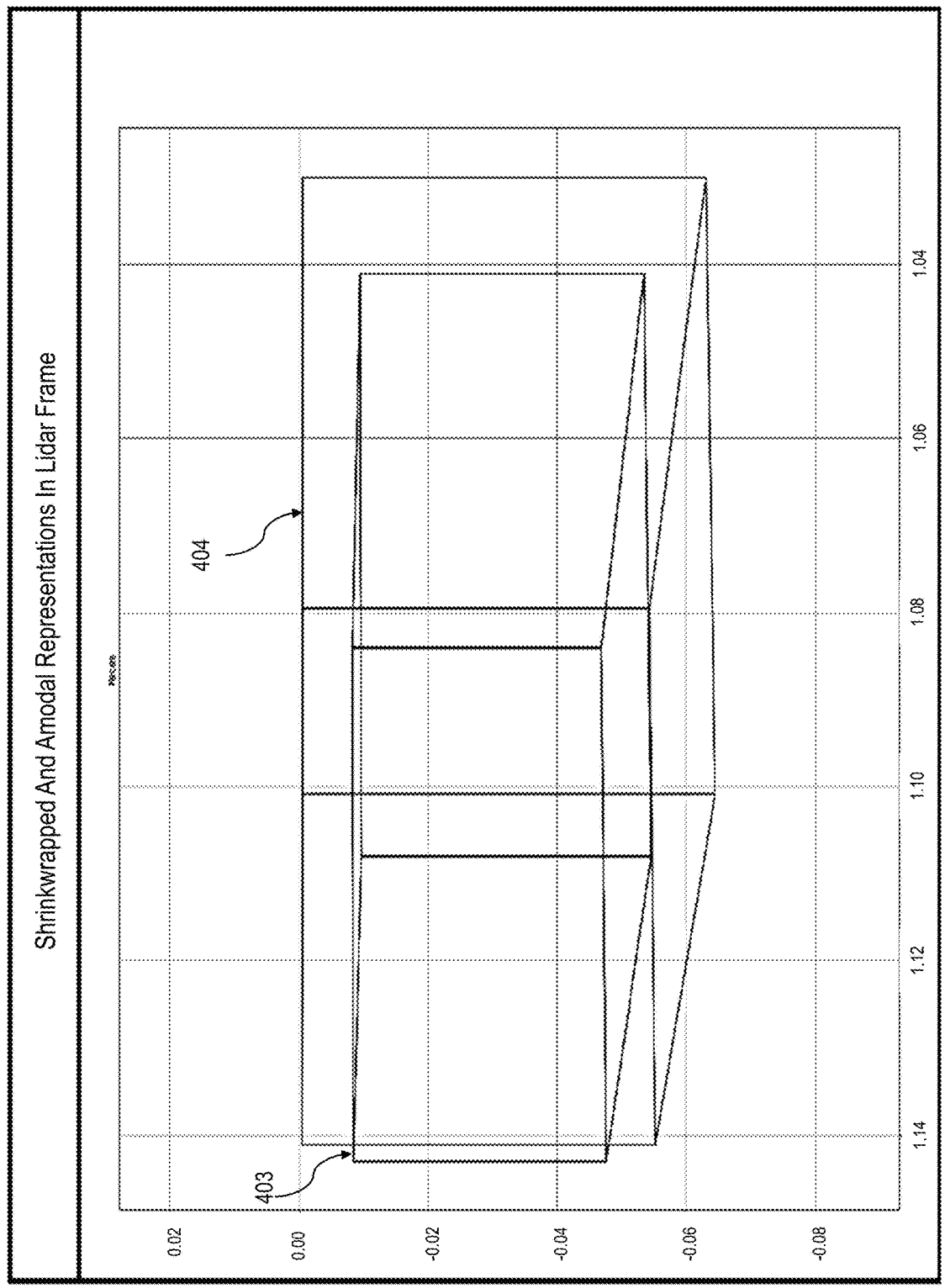

Algorithm 2
Input: Road Object/actors' shrinkwrapped cuboid and amodals_cuboid, lidar SE3 vehicle
Output: Boolean value indicates if an object/actor is detectable or not
Steps:
1. Transform both input cuboids from vehicle frame to lidar frame
2. Transform each point of the cuboids (lidar frame) to azimuth-elevation frame (project into space), (after this step all the faces of each cuboid will be transformed to polygons in the same plane)
3. Merge resulting polygons from each cuboid through union operation to determine two polygons—one from the shrinkwrapped and another one from the amodal cuboid
4. Compute intersection over union (IOU) between the two polygons
5. Compare the resulting IOU with a threshold (e.g., IOU_AZI_ELE_THRESHOLD, etc.) to determine detectability FIG. 4A is an example output of Algorithm 2 for a road actor 401. FIG. 4A may be output by the visualization layer of the perception module 120. The track for the road actor 401 may include a UUID (e.g., track_id=42). An information element 402 may display relevant information such as the UUID for the road actor 401, a speed of the road actor 401, and an indication of the thresholded IOU for the road actor 401 (e.g., the road actor 401 satisfies the detectability threshold, etc.). FIG. 4B shows an example of a shrinkwrapped and amodal representation of the road actor 401 resulting from Algorithm 2. FIG. 4B may be output by the visualization layer. A shrinkwrapped representation 403 and an amodal representation 404 are shown in a lidar frame.

Figure 4C:
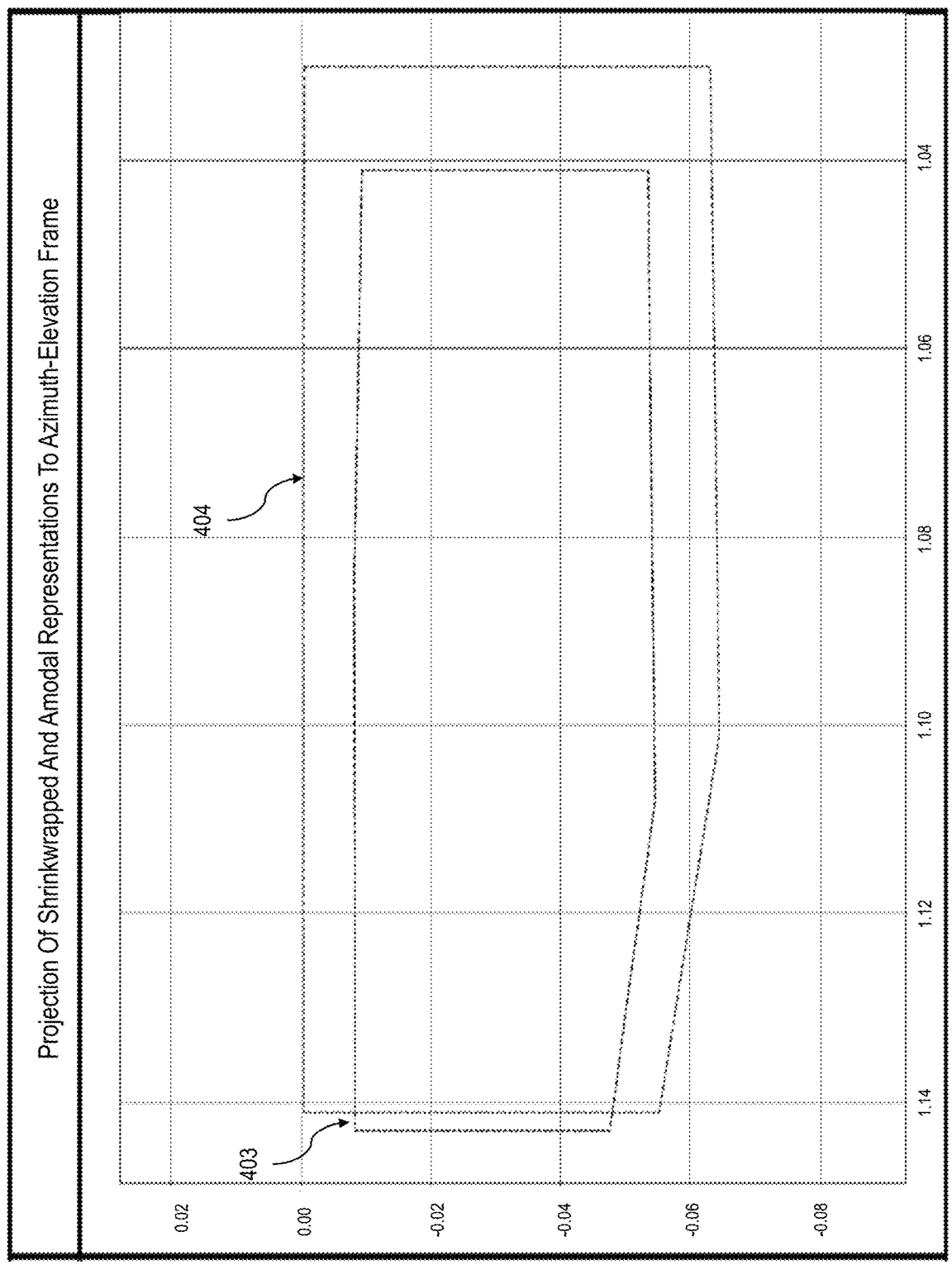

FIG. 4C shows an example of the shrinkwrapped representation 403 and the amodal representation 404 projected to an azimuth-elevation frame.

According to some aspects, the calculation layer of the perception module 120 may determine and/or compute motion profiles for road actors within a drivable area of the AV 102*a*. For example, motion profiles may be determined for large vehicles, regular vehicles, and/or motorcycle actors that pass the detectability check. For detected road actors, the calculation layer may generate deceleration and acceleration (including maintaining lane speed) trajectories to model the behavior of the road actors in the next 4 seconds. The direction of both acceleration and deceleration trajectories may be limited by lateral accelerations and minimum turning radii. According to some aspects, acceleration trajectories may also simulate road actor behaviors/actions such as u-turns, left turns, and right turns. For example, deceleration profiles may be generated and/or determined for detected road actors based on Algorithm 3 shown below.

Algorithm 3
Input: lateral acceleration limit, initial velocity, deceleration limits, jerk limits, map_SE3_actor, minimum turning radius
Output: deceleration trajectories
Steps:
1. Compute starting turning radius using the following equation:

$$r_0 = \max(\text{initial\_velocity}^2/\text{lateral acceleration limit},\ \text{minimum turning radius})$$

2. For r=$r_0$ to 10,000 m (nearly straight line):
   a. Compute longitudinal trajectory using bang-off-bang trajectory optimization functions, that evaluates the vehicle from to $v_{start}=v_0$ mph to $v_{end}=v_0$ mph, using deceleration and jerk limits input parameters
   b. To determine longitudinal trajectory, extend the beginning of the longitudinal trajectory by $t_{latency}$ at a constant speed of $v_0$ to simulate vehicle reaction time
   c. If the duration of the trajectory is less than a value (e.g., four seconds, etc.), extend in place until four seconds. If the trajectory length is more than four seconds, trim the trajectory to four seconds
   d. Compute the $(x_i, y_i)$ locations along the trajectory using the following equation:

$$\theta_i = \frac{s_i}{r}, (x_i, y_i) = (r*\sin\theta_i,\ r*(\cos\theta_i - 1))$$

e. Transform to map coordinates using map_SE3_actor
   f. Create a trajectory from position, velocity information computed above $(x_i, y_i)$. Above $(x_i, y_i)$ corresponds to the center of the rear axle of the road actor
   g. Append trajectory to output list According to some aspects, longitudinal trajectories to stop a road actor from arbitrary speed $v_0$ may be generated and/or determined based on Algorithm 4 shown below.

Algorithm 4
Input: lateral acceleration limit, initial lateral acceleration limit, initial velocity, deceleration limits, jerk limits
Output: longitudinal trajectory that satisfies initial and final conditions within vehicle capability constraints
Steps:
1. Compute stopping distance from $v_0$, for example, using a motion control function from a third-party motion control module. For example, the function "PyLongitudinalPropagator.minimum_stopping_distance_m( )" may be used to compute the stopping distance
2. Use the computed stopping distance as seed for the function compute_time_optimal_trajectory_bob( ) with the following constraints:

$v_{start} = v_0$;
$v_{end} = 0.0$ mps;
$a_{start} = 0.0$ mps;
$a_{end} = 0.0$ mps;
$s_{start} = 0$ m;
$s_{end} = s_f$ $$\min_{accel} = -\max\_decel - g * \sin\left(\arctan\left(\frac{grade}{100}\right)\right);$$

Figure 5A:
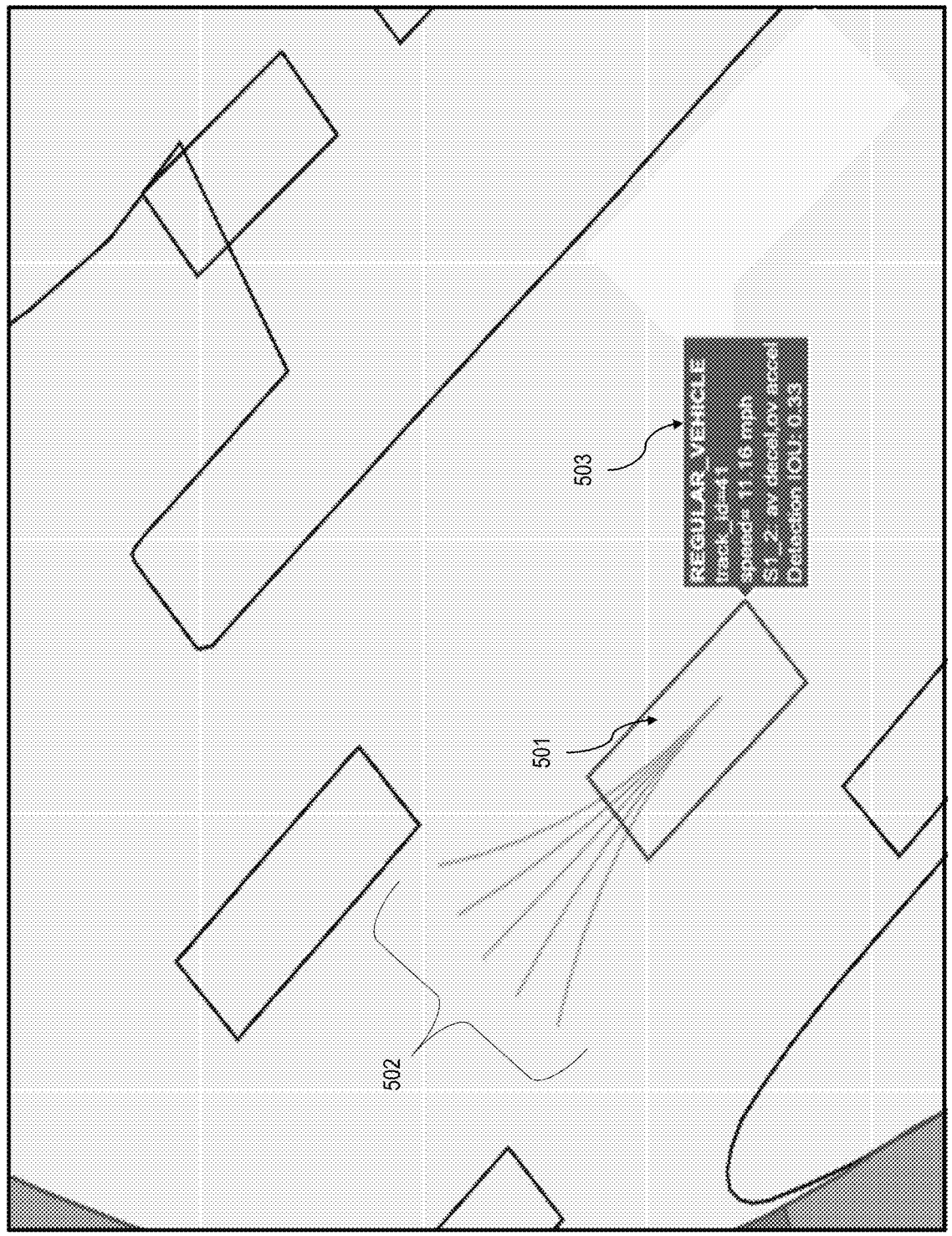
FIGS. 5A and 5B show examples of road actor deceleration profiles at different speeds, in accordance with aspects of the disclosure.
Figure 5B:
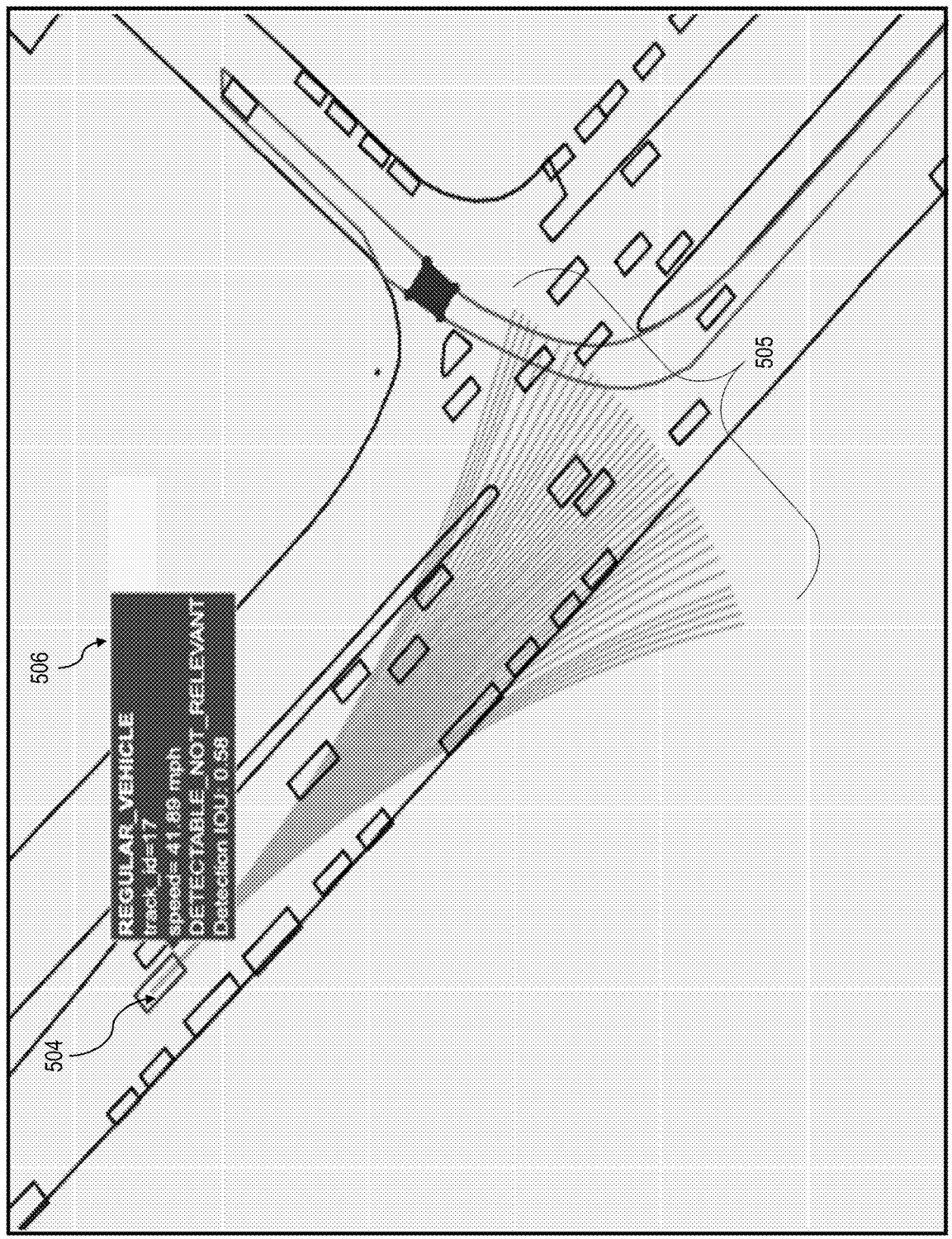

$\max_{jerk} = \max\_jerk$;
**grade, max_decel and max_jerk are user defined
3.
   a. If the return of the function compute_time_optimal_trajectory_bob( ) is "Not successful", recall the function with the same constraints but with $s_{end+} = 0.25$ m until the function returns "Success"
   b. If the return of the function compute_time_optimal_trajectory_bob( ) is "Successful", recall the function with same constraints but with $s_{end-} = 0.25$ m until the function returns "Not Success"
   c. Return the last successful bang-off-bang computed trajectory which contains the following information (after downsampling to 100 points):
      time_stamp along the trajectory=t[ ];
      Longitudinal distance along the trajectory=s[ ];
      Longitudinal velocity along the trajectory=v[ ];
      Longitudinal acceleration along the trajectory=a[ ];

FIGS. 5A and 5B show examples of road actor deceleration profiles at different speeds. FIGS. 5A and 5B may be output by the visualization layer of the perception module 120. FIG. 5A shows a road actor 501 and deceleration trajectories 502. An information element 503 may display relevant information such as the UUID (e.g., track_id=41) for the road actor 501, a speed of the road actor 501, and a severity ranking (S1_2) which represents, for example, a degree of damage caused by a potential collision with the AV 102a (e.g., if it is miss detected and/or undetected by the perception module 120, etc.), and an indication of the thresholded IOU for the road actor 501 (e.g., an indication of that the road actor 501 satisfies the detectability threshold, etc.).

FIG. 5B shows a road actor 504 and deceleration trajectories 505. An information element 506 may display relevant information such as the UUID (e.g., track_id=17) for the road actor 504, a speed of the road actor 501, and an indication of the thresholded IOU for the road actor 504 (e.g., an indication of that the road actor 501 is not relevant because it does not satisfy the detectability threshold, etc.).

According to some aspects, the calculation layer of the perception module 120 may determine acceleration profiles for road actors. An acceleration profile simulates a road actor accelerating from its current speed (extracted from the ground truth labels) to the lane speed (or maintaining its current speed if it is at lane speed). The perception module 120 may consider non-compliant actors by modeling the acceleration path as driving on circles of different radii for distance, then continuing on a straight line from the last heading at the end of the circular movement. The minimum turning radius may be dependent on the road actor (e.g., the information may be extracted from JAMA object parameters and/or determined by assumption. FIGS. 6A-6D show trajectories of non-compliant road actors by modeling the acceleration path as driving on circles of different radii for distance, then continuing on a straight line from the last heading at the end of the circular movement. FIGS. 6A-6D may be output by the visualization layer of the perception module 120

Figure 6A:
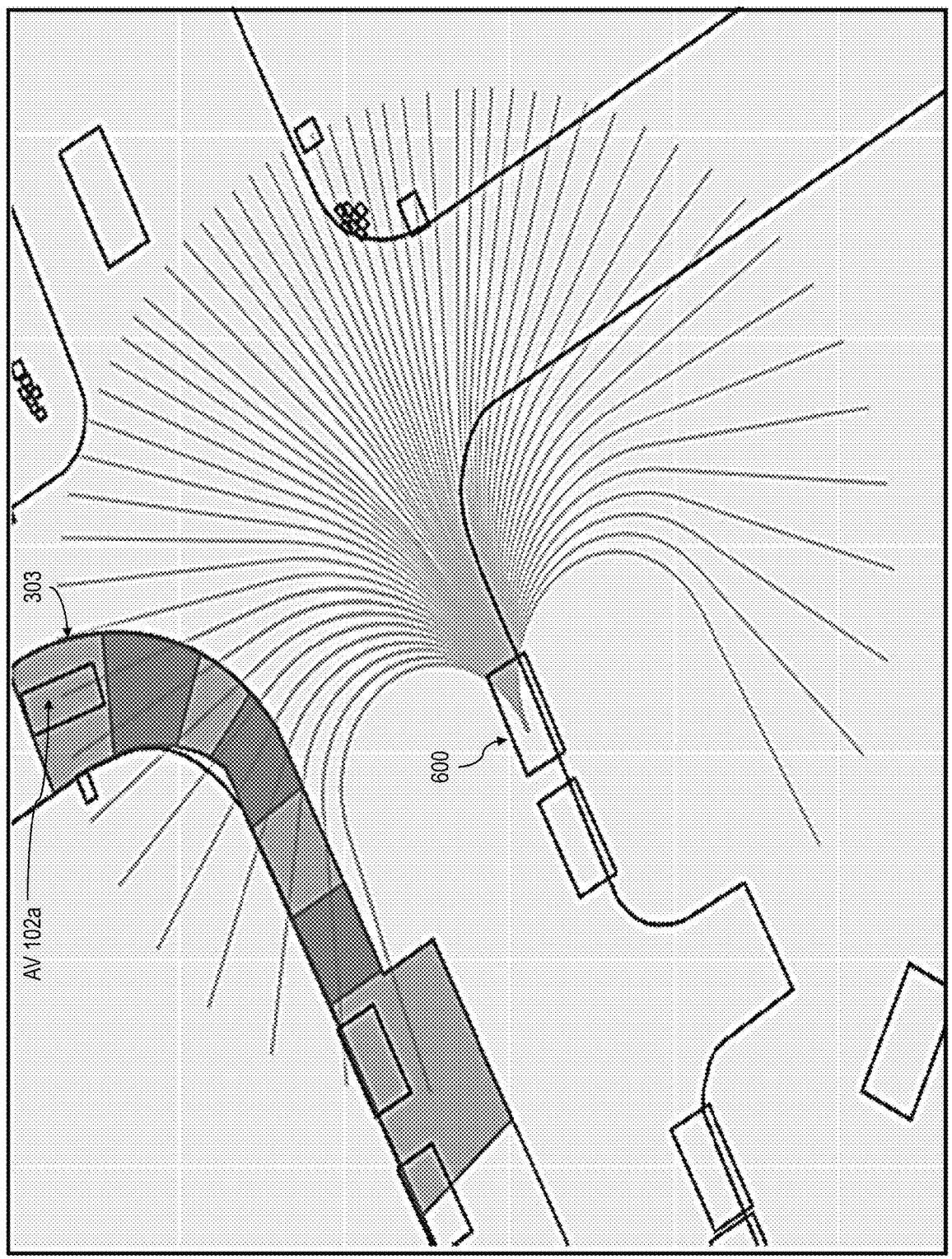
FIGS. 6A-6D show examples of trajectories of non-compliant road actors, in accordance with aspects of the disclosure.
Figure 6B:
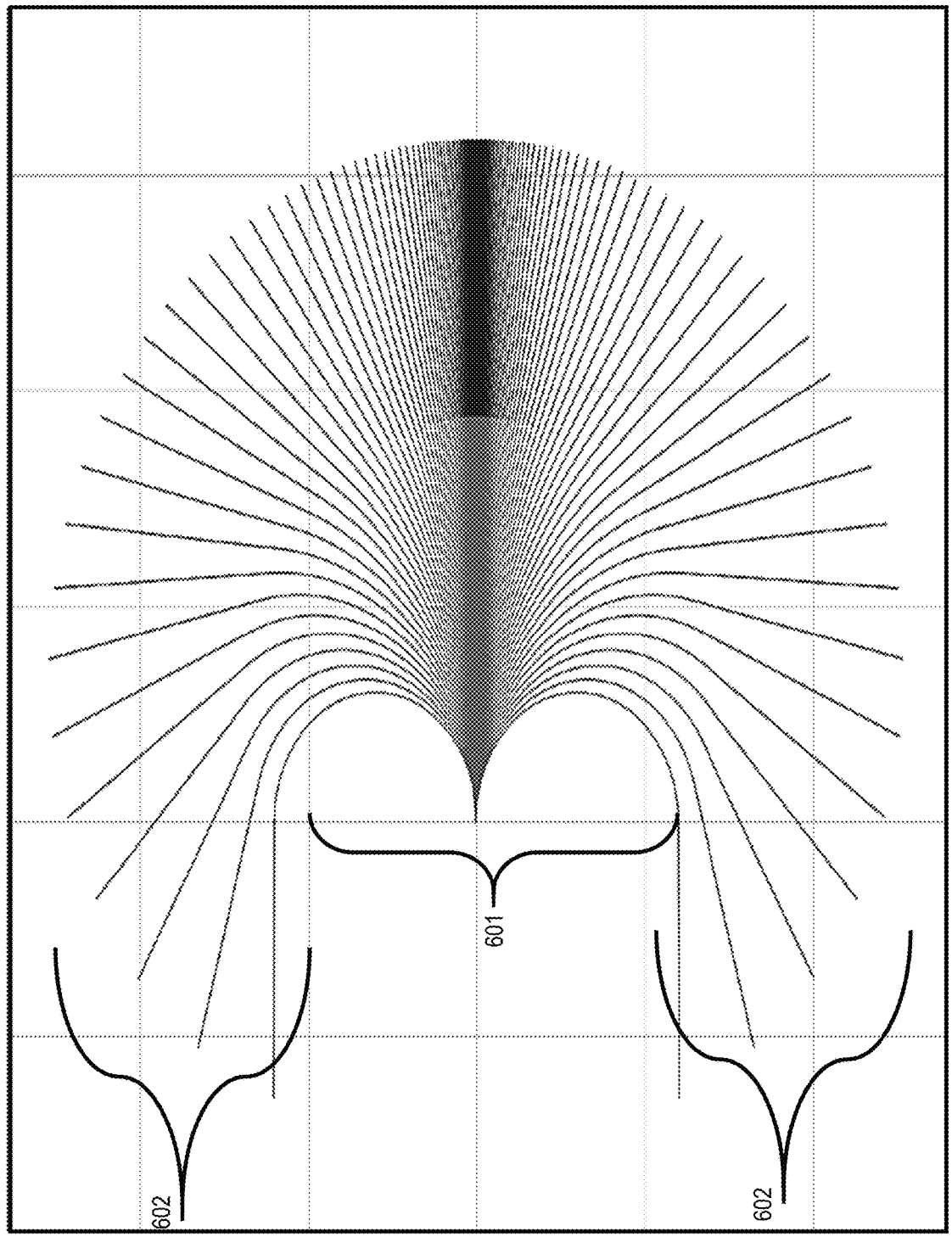

FIG. 6A shows an example of acceleration motion for a road actor from the last heading of the circular motion. FIG. 6A shows acceleration motion for a road actor 600 performing a non-compliant turn in place in front of the AV 102a starting from a speed of zero miles per hour. FIG. 6B shows an example of circular motion and linear motion for a road actor from the last heading of the circular motion. FIG. 6B shows circular motion 601 and linear motion 602 for the road actor 600.

Figure 6C:
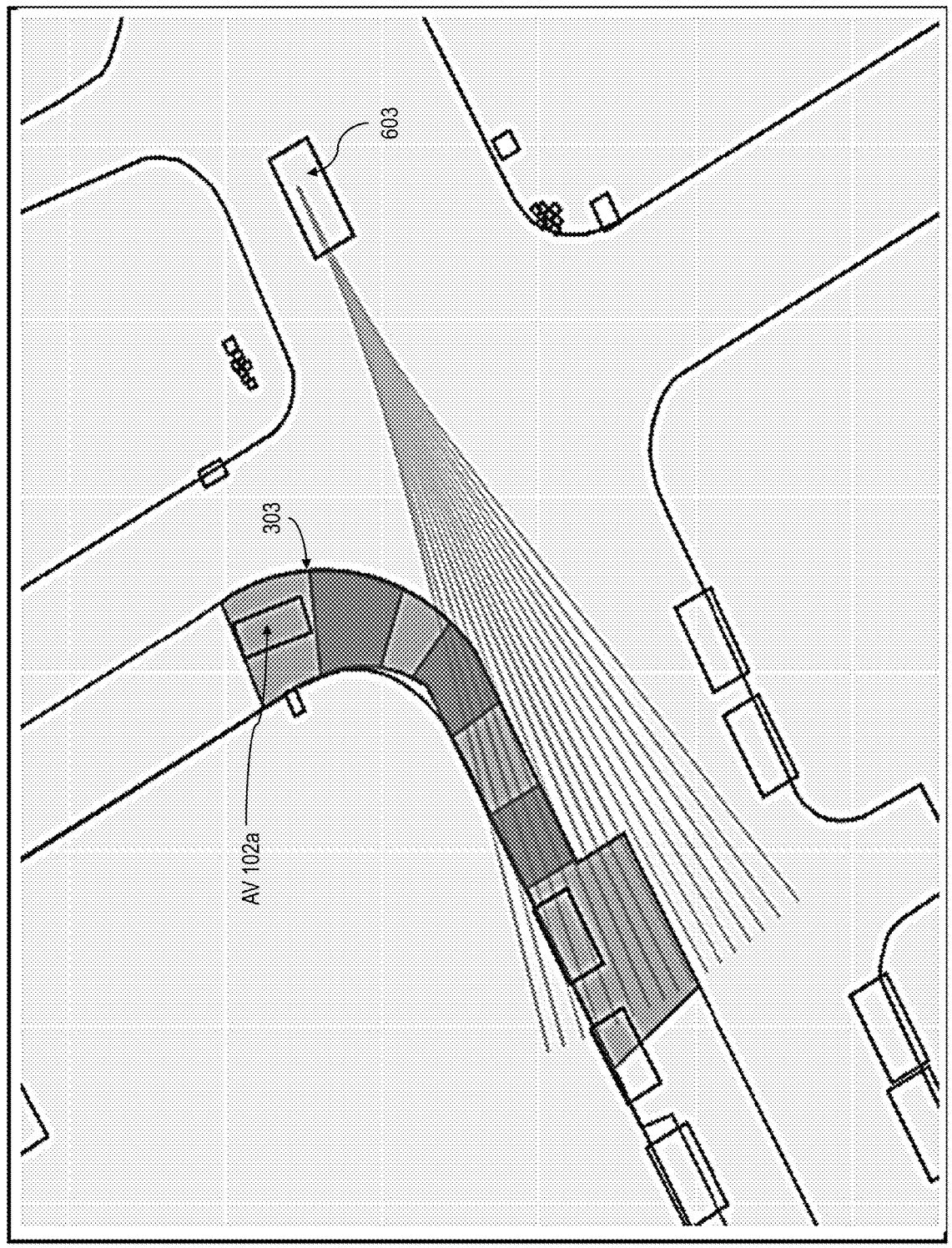
Figure 6D:
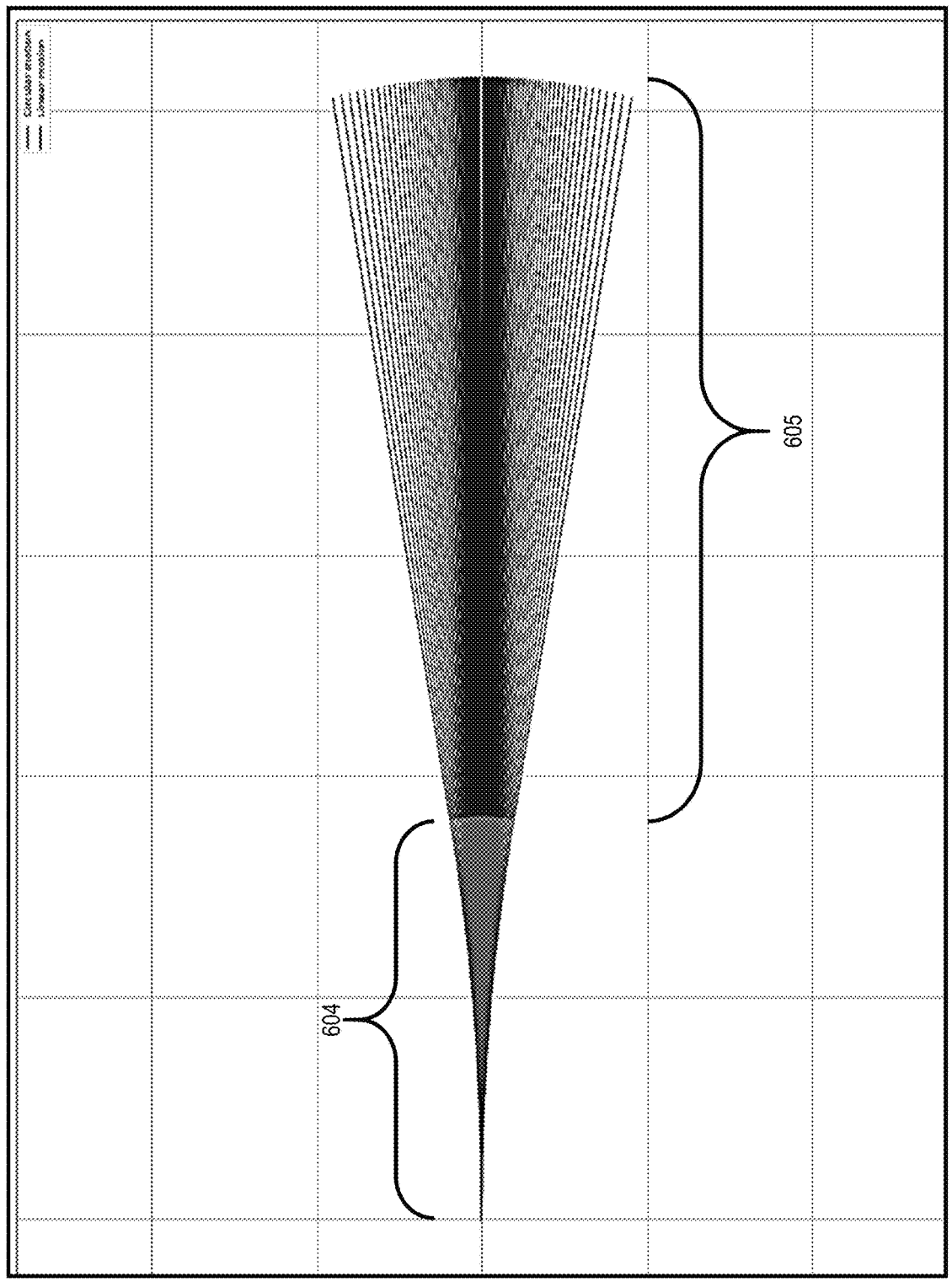

FIG. 6C shows an example of acceleration motion for a road actor from the last heading of the circular motion. FIG. 6C shows acceleration motion for a road actor 603 performing a turn in place in front of the AV 102a starting from a speed of thirty miles per hour. As shown in FIG. 6C, a U-turn, a left-turn, and a right turn is not feasible for the road actor 603 at thirty miles per hour. FIG. 6D shows an example of circular motion 604 and linear motion 605 for the road actor 603.

According to some aspects, acceleration profiles for road actors may be generated and/or determined based on Algorithm 5 shown below.

Algorithm 5

Input: lateral acceleration limit, initial velocity, deceleration limits, jerk limits, map_SE3_actor, minimum turning radius Output: acceleration trajectories Steps:
1. Compute starting radius using the following equation:

$r_0 = \max(\text{initial\_velocity}^2/\text{lateral\_acceleration limit},$
$\qquad \text{minimum turning radius})$ 2. For $r = r_0$ to 10,000 m (nearly straight line):
   a. Compute longitudinal trajectory that takes the road actor from from $v_{start}$=road actor's current speed, to final speed (max lane segment speed within a circle of DISTANCE_FROM_OV_FOR_LANE_SPEED_SEARCH=20 m radius centered around the road actor)
   b. If the duration of the trajectory is less than a value (e.g., four seconds, etc.), extend the duration using constant speed until four seconds. If the trajectory length is more than four seconds, trim the trajectory to four seconds.
   c. Compute the $(x_i, y_i)$ locations along the trajectory using the following equation:

$$\theta_i = \frac{s_i}{r}$$

$(x_i, y_i) = (r * \sin\theta_i, r * (\cos\theta_i - 1))$; for $s_i < d$ $(x_i, y_i) = (y_i - s_i * \sin\theta_i, y_i + s_i * (\cos\theta_i - 1))$;

for $s_i > d$ d. Transform $(x_i, y_i)$ to map coordinates using map_SE3_actor e. Create a trajectory from position, velocity information computed above $(x_i, y_i)$. Above $(x_i, y_i)$ corresponds to the center of the rear axle of the road actor f. Append trajectory to output list According to some aspects, if a road actor is found to be detectable and within a drivable area of the AV 102a, the calculation layer of the perception module 120 may use Algorithm 6, shown below, to find if the road actor is relevant or not.

Algorithm 6

Input:

Evaluation_list=
[(ov_accel_trajectories, av_isotemporal_accel_polygon),
(ov_accel_trajectories, av_isotemporal_decel_polygon),
(ov_decel_trajectories, av_isotemporal_accel_polygon),
(ov_decel_trajectories, av_isotemporal_decel_polygon)];
drivable area, stationary road actors Output: a list of trajectories that make the road actor intersect with the AV (AV 102a) for each (ov_trajectoies, av_isotemporal_polygons) pair in evaluation list Steps:
1. Down-select trajectories that intersect with the union of av_isotemporal_polygon
2. Trim any trajectories that leave the drivable area or intersect with other static objects or road actors
3. Downselect trajectories that intersect with the isotemporal polygons within their respective time windows
4. Return the output of step 3

Figure 7A:
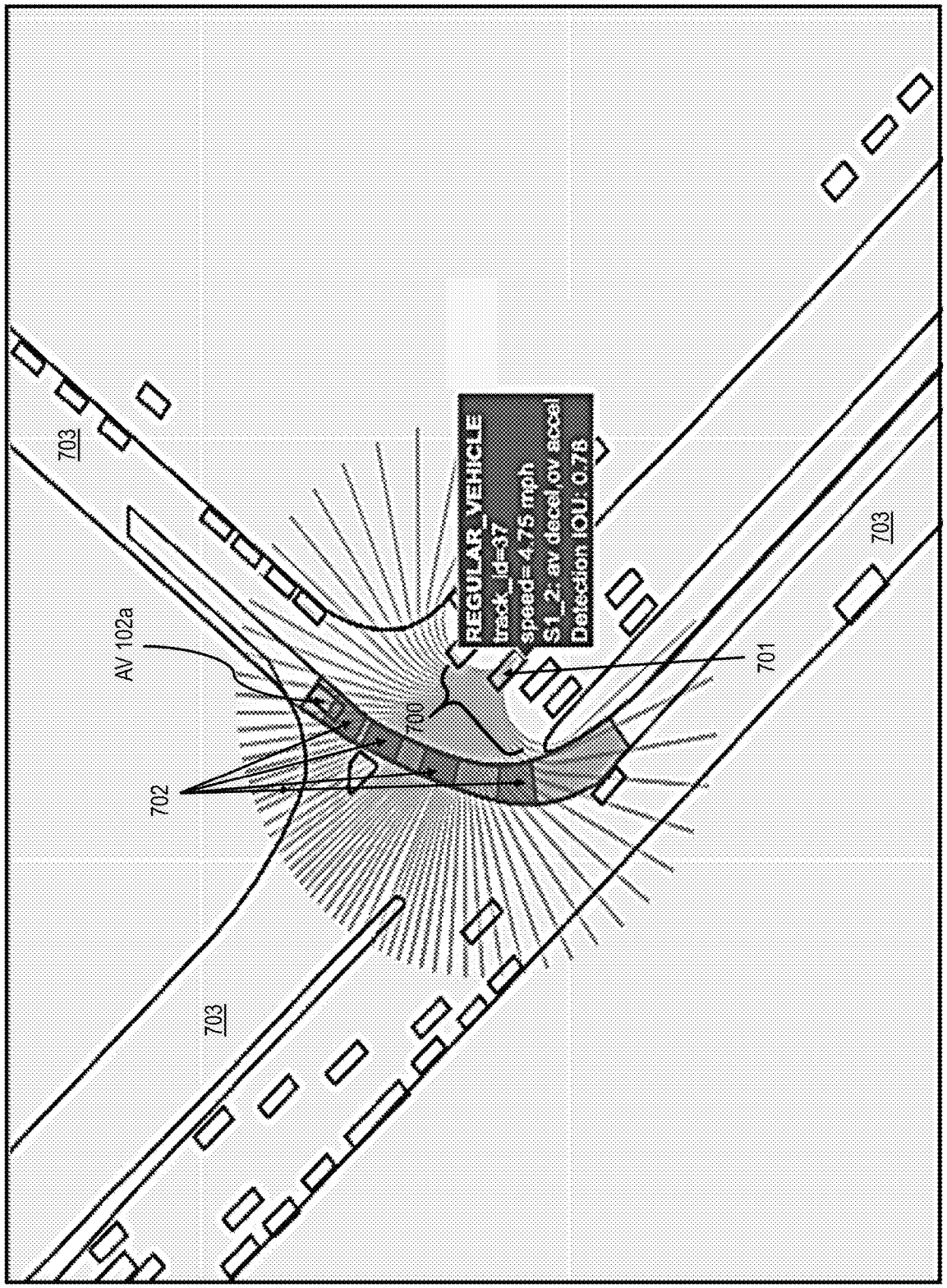
FIGS. 7A-7C show example outputs of steps for determining acceleration trajectories for road actors, in accordance with aspects of the disclosure.
Figure 7B:
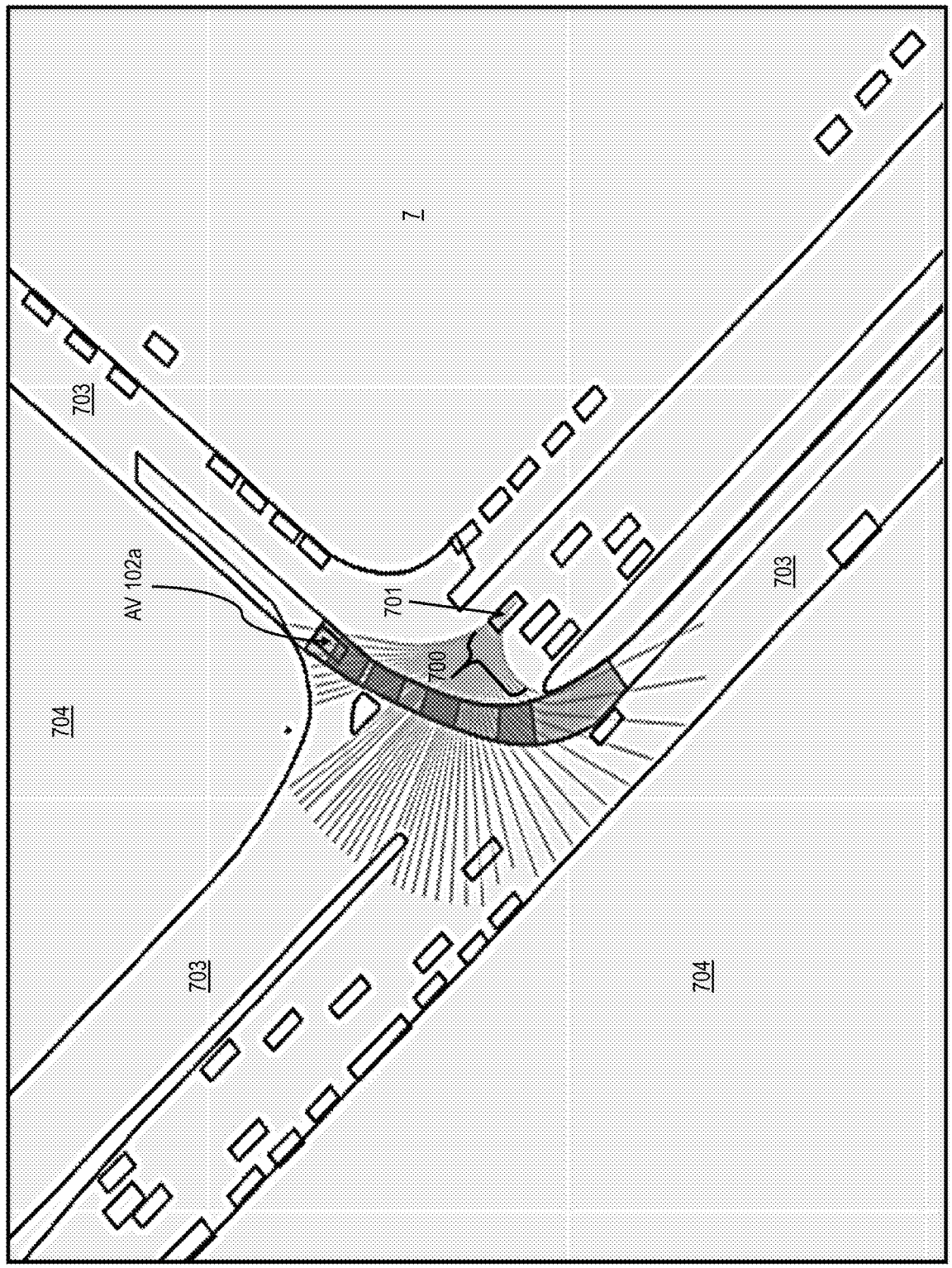
Figure 7C:
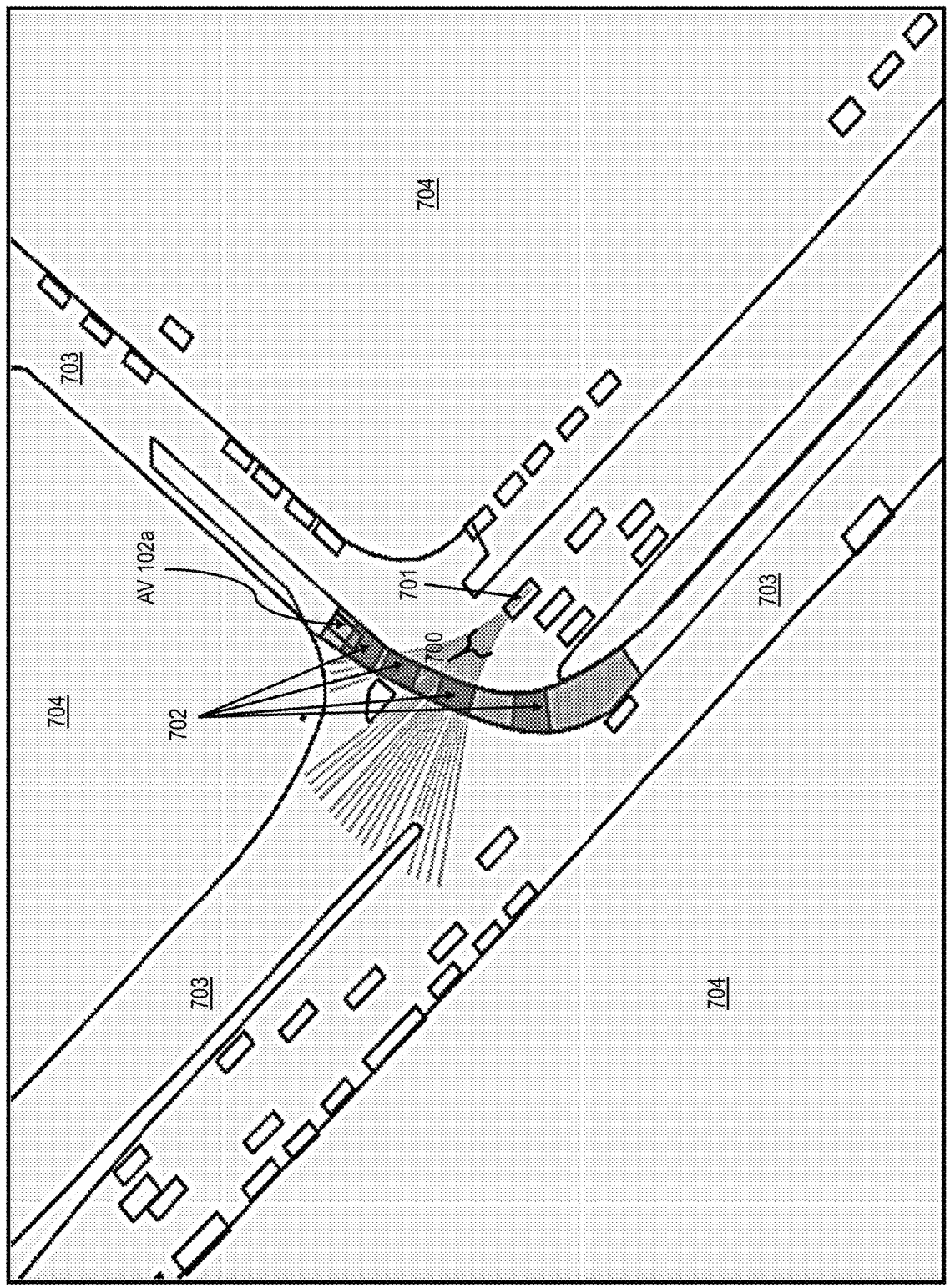

FIGS. 7A-7C show example outputs for each step of Algorithm 6. FIGS. 7A-7C may be output by the visualization layer of the perception module 120. FIG. 7A shows trajectories 700 of a road actor 701 that intersect with at least one isotemporal polygon representation 702 of the AV 102a at a respective time window along an intended path of the AV 102a within a drivable area 703. FIG. 7B shows trajectories 700 of the road actor 701 that leave the drivable area 703 (into a non-drivable area 704) or intersect with other static objects or road actors within the drivable area 703. FIG. 7C shows trajectories 700 of the road actor 701 that intersect with the isotemporal polygons within their respective time windows.

According to some aspects, the perception module 120 may manage special and/or outlier situations where objects (e.g., spatially relevant objects, etc.) affect a trajectory of the AV 102a. For example, the perception module 120 considers parked vehicles along a route of the AV 102a. If a road actor has a speed of less than a preset value (e.g., 0 mph, etc.), the perception module 120 may consider the road actor relevant if its polygon intersects with any of the acceleration or deceleration isotemporal regions of the AV 102a. The perception module 120 considers situations where road actors may be traveling in reverse by determining if the reversing motion profiles of the road actors intersect with any of the acceleration or deceleration isotemporal regions of the AV 102a. If the reversing motion profiles of the road actors intersect with any of the acceleration or deceleration isotemporal regions of the AV 102a, the road actor will be considered relevant. The perception module 120 considers situations where road actors (either parked or in motion) have any open doors and/or protruding elements, and may dilate the isotemporal polygon of the AV 102a accordingly. The perception module 120 considers situations where the AV 102a comes to a stop behind a stopping/stopped road actor causing the respective braking isotemporal polygons will have an intersection but the respective accelerating polygons may not. The perception module 120 considers situations, where the AV 102a comes to a stop behind a stopping/stopped road actor spatially relevant because the road actor may not always be able to accelerate (e.g., if there is at a red light, etc.). The perception module 120 considers situations, where a road actor is parked and pulls out into a lane traveled by the AV 102a. The respective braking isotemporal polygons of the road actor and the AV 102a will not intersect, but the respective accelerating isotemporal polygons will. The perception module 120 considers situations, where a road actor is parked and pulls out into a lane traveled by the AV 102a to be spatially relevant to the AV 102a because this is a common scenario that the AV 102a must decelerate for. The perception module 120 considers situations where the AV 102a may decelerate to avoid a collision with a road actor as part of the motion profile for the AV 102a to avoid causing the AV 102a to cause another collision by avoiding collision. According to some aspects, the perception module 120 may manage any special and/or outlier situations where objects (e.g., spatially relevant objects, etc.) affect a trajectory of the AV 102a by considering the motion profiles of all perceived road actors in multiple situations (both potential situations and hypothetical situations).

According to some aspects, the calculation layer of the perception module 120 may determine and/or compute a classification, such as a severity ranking and/or the like, for each perceived road actor. The perception module 120 may execute logic and/or a function in a class that assumes that the perception module 120 did not output a track for a road actor and the resulting worst-case severity of a collision between the AV 102a and the road actor. For each road actor trajectory identified and/or determined to be relevant to a trajectory of the AV 102a, the logic and/or a function intersects that trajectory with the corresponding trajectory of the AV 102a to find the collision points and then assigns and/or determines the collision severity at that point. The perception module 120 considers that a road actor could collide with the AV 102a in multiple locations because its motion profiles could have multiple trajectories. Accordingly, the calculation layer may assign and/or determine the severity of the road to be the maximum severity at the multiple collision points.

Figure 8:
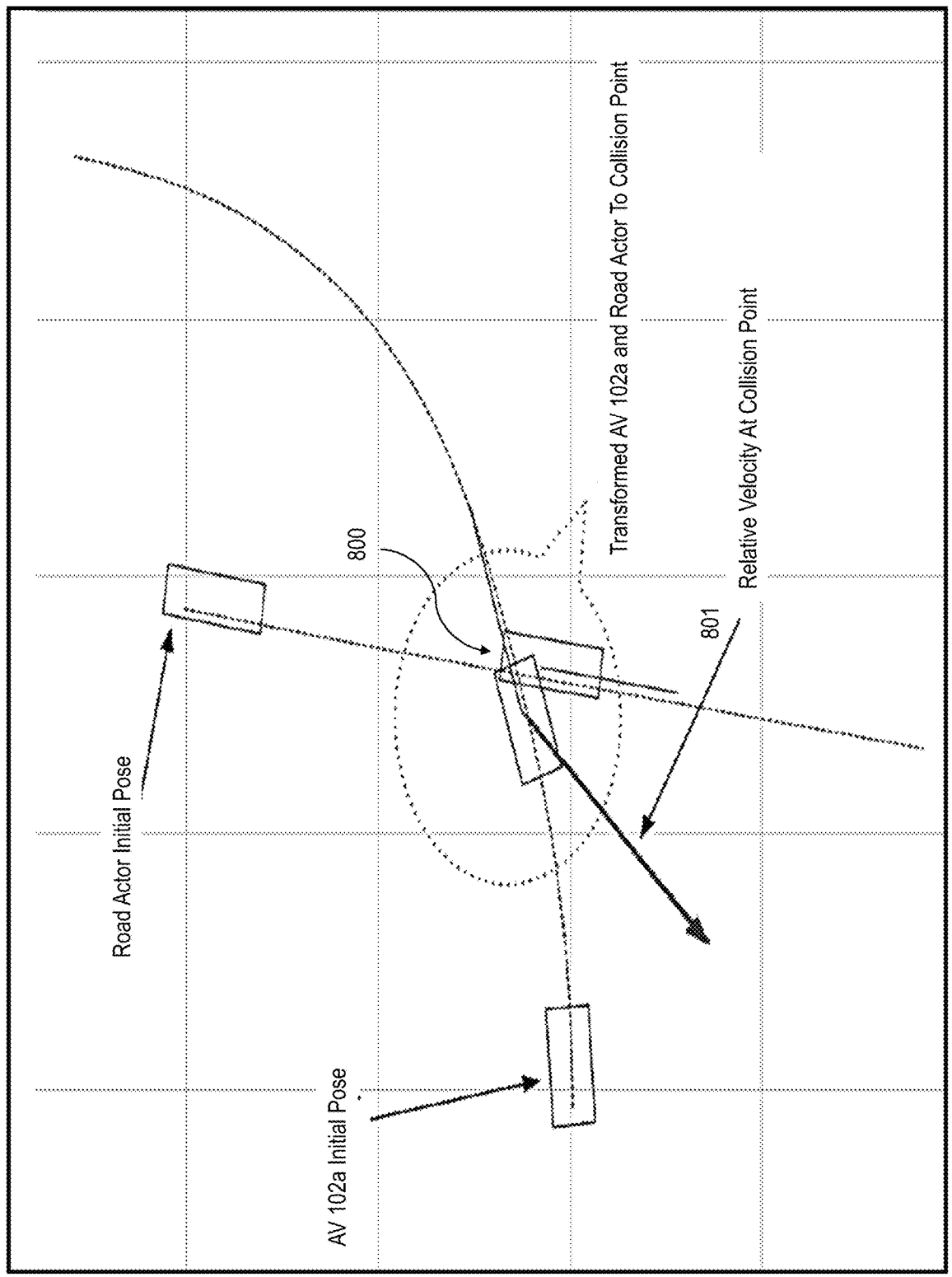
FIG. 8 shows an example where the trajectory of a road actor intersects the trajectory of a vehicle, in accordance with aspects of the disclosure.

FIG. 8 shows an example of a situation where a trajectory of a road actor intersects the trajectory of the AV 102a. FIG. 8 may be output by the visualization layer of the perception module 120. The trajectory of the AV 102a and the trajectory of the road actor are transformed to a collision point 800 and the collision severity is determined and/or assigned at the collision point 800. A vector 801 represents the relative velocity at the collision point 800.

Figure 9:
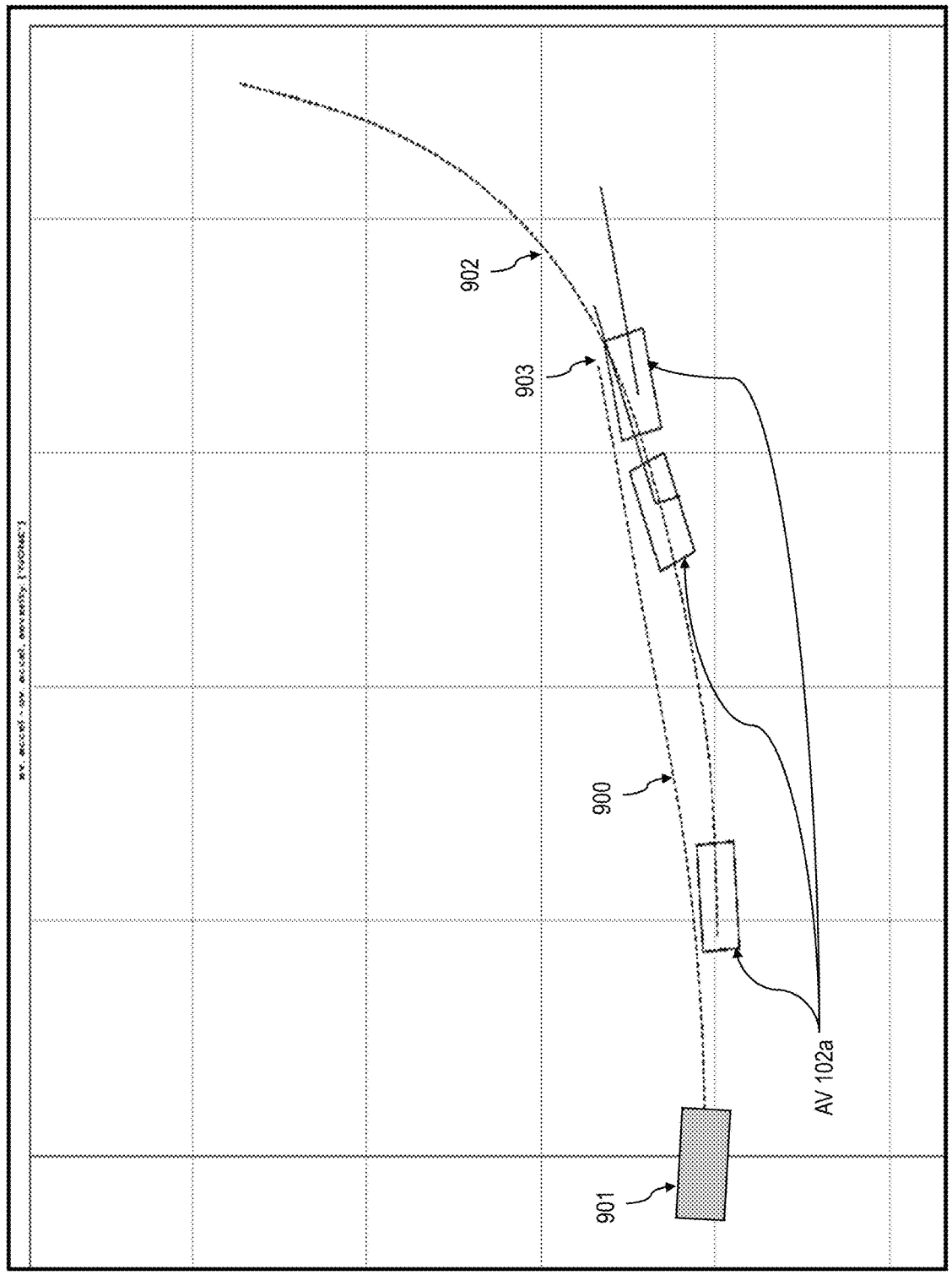
FIG. 9 shows an example of a situation where a trajectory of a road actor does not intersect the trajectory of a vehicle but intersect with an isotemporal polygon of the vehicle, in accordance with aspects of the disclosure.

FIG. 9 shows an example of a situation where a trajectory of a road actor does not intersect the trajectory of the AV 102a but intersect with an isotemporal polygon of the AV 102a. FIG. 9 may be output by the visualization layer of the perception module 120. According to some aspects, in situations where a trajectory 900 of a road actor 901 does not intersect a trajectory 902 of the AV 102a but intersects with an isotemporal polygon of the AV 102a, the calculation layer of the perception module 120 may consider all possible interactions between the road actor 901 and the AV 102a. The calculation layer of the perception module 120 may consider all possible interactions between the road actor 901 and the AV 102a by, for each point along its trajectory 900, transform/project isotemporal polygons of the AV 102 to each point along trajectory 902. The calculation layer may determine the time for each point along trajectory 902. If the time for a point 903 along the trajectory 902 corresponds to the isotemporal region of the AV 102*a*, the calculation layer may transform/project the road actor 901 on its trajectory 900 to the point 903 and determine/compute a severity ranking (e.g., maximum severity, etc.) for the collision. If a collision does not occur based on the transformation/projection, the severity ranking may be zero (e.g., no severity, etc.).

Figure 10:
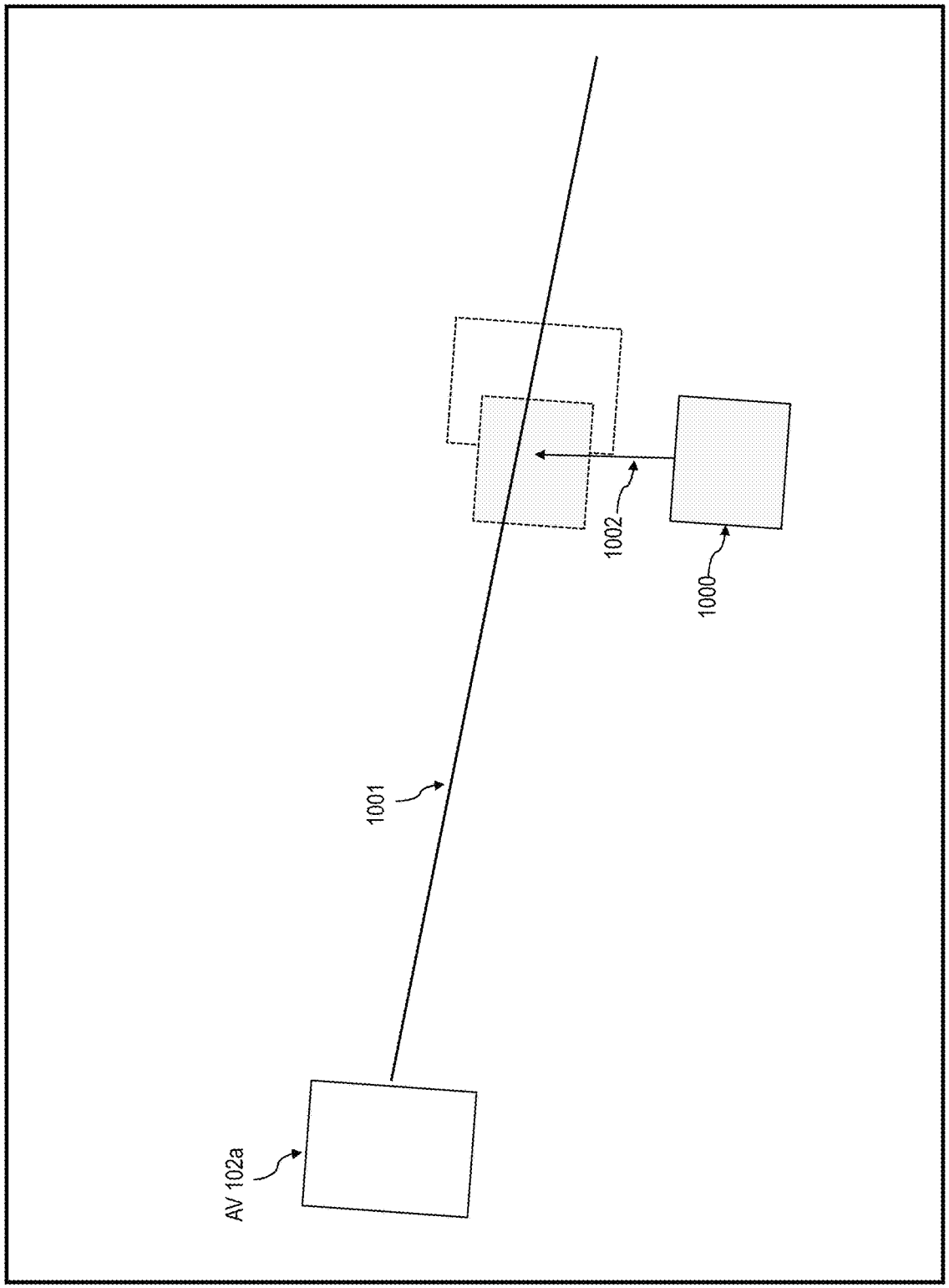
FIG. 10 shows an example situation where a road actor is parked but within close proximity to a trajectory of a vehicle, in accordance with aspects of the disclosure.

FIG. 10 shows an example situation where a road actor is parked but within proximity to a trajectory of the AV 102*a*. FIG. 10 may be output by the visualization layer of the perception module 120. According to some aspects, in situations where a road actor 1000 is parked but within proximity to a trajectory 1001 of the AV 102*a*, the representation of the road actor 1000 may be transformed/projected (projection line 1002) to the closest point on the trajectory 1001 and a severity ranking may be determined and/or assigned. The speed of the road actor 1000 may be considered zero miles per hour.

According to some aspects, the perception system 120, for example via the visualization layer may provide multiple interfaces to visualize the data describing objects (e.g., spatially relevant objects, etc.) affecting a trajectory of the AV 102*a*. For example, the visualization layer may include integration applications that provide integration between notebooks, documents, and activities such as JupyterLab, Eclipse, PyCharm, AWS Cloud9, Kite, Wing Python IDE, Selenium IDE, ae like. The visualization layer may execute one or more functions to visualize any algorithm used to determine perceptually relevant objects (e.g., spatially relevant objects/road actors, etc.) that may affect a trajectory of the AV 102*a* (e.g., FIGS. 7A-7C, etc.), visualize detectability of road actors (e.g., FIGS. 4A-4C, and/or visualize severity interactions (e.g., FIGS. 8-10, etc.). According to some aspects, the visualization layer of the perception module 120 may output classifications (e.g., indications of severity, relevancy, etc.) for road actors.

According to some aspects, the visualization layer of the perception module 120 may output and/or cause a display of relevancy statistics for road actors. For example, the perception module 120 may execute a function that provides an interface to allow the spatially relevant object (SRO) algorithms to run at scale on thousands of log slices. For each log slice, the output may be a data file, such as a Python dictionary and/or the like, that includes stored data elements/values (e.g., maps, etc.) that may be serialized and imported to other systems for further analysis or visualization.

Figure 11:
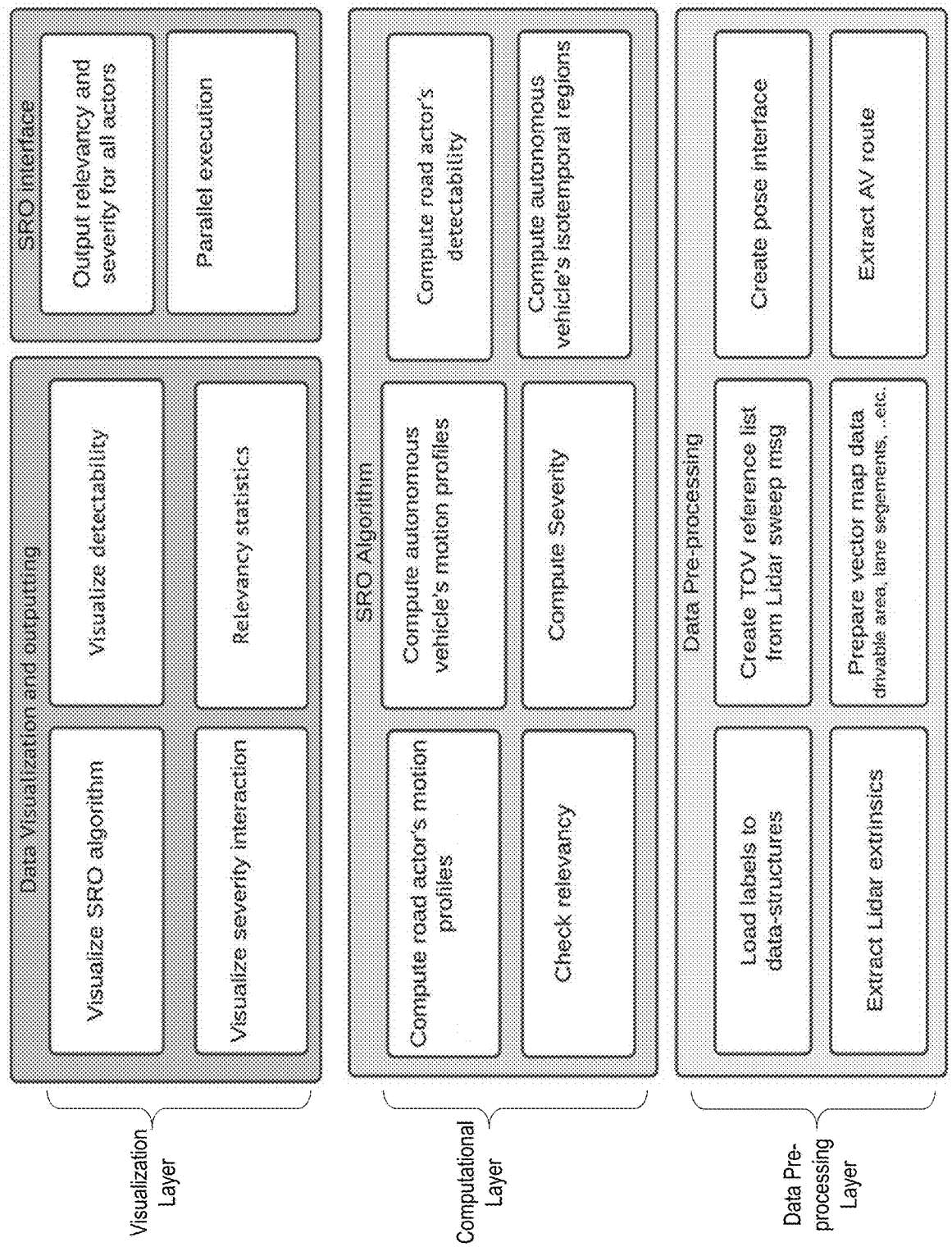
FIG. 11 is an example chart showing a high-level overview of operations for detecting objects affecting a trajectory of a vehicle, in accordance with aspects of the disclosure.

According to some aspects, FIG. 11 provides a high-level overview of operations performed at each layer of the perception module 120. As shown in FIG. 11 and according to some aspects, the data pre-processing layer of the perception module 120 may facilitate loading labels to data structures. For example, the data pre-processing layer of the perception module 120 may load and/or facilitate loading ground truth labels that include labels for road actors that are partially occluded, timing labels for tracks based on the TOV of the lidar sweep messages, amodal cuboid labels, shrink-wrapped labels, and/or velocity/speed labels for any tracked object based on information received from a remote source, third-party, and/or a local repository. The data pre-processing layer of the perception module 120 may use and/or facilitate the use of sensor data/information to create/generate TOV reference list(s) from lidar sweep messages. The data pre-processing layer of the perception module 120 may create/generate a pose interface that displays and/or represent a pose (e.g., orientation, etc.) for the AV 102*a* and/or any sensed objects/actors. The data pre-processing layer of the perception module 120 may extract and/or facilitate extraction of lidar extrinsics, generate and/or prepare vector map data (e.g., data used to represent a drivable area, lane segments, etc.), and/or determine (e.g., extract from on-board computing data, etc.) a route of the AV 102*a*.

As shown in FIG. 11 and according to some aspects, the computational layer of the perception module 120 may execute algorithms and/or functions to compute and/or determine motion profiles from road actors, compute and/or determine a motion profile for the AV 102*a*, and compute and/or determine the detectability of the road actors. The computational layer of the perception module 120 may execute algorithms and/or functions to check the perceptual relevancy of the road actors for the AV 102*a*, compute and/or determine isotemporal regions for the AV 102*a*, and based on the relevancy of the road actors and respective motion profiles, compute, determine, and/or assign a severity ranking for a collision between the road actors and the AV 102*a*.

As shown in FIG. 11 and according to some aspects, the visualization layer of the perception module 120 may be used to visualize and/or display the output and/or execution of algorithms and/or functions executed by the computational layer. The visualization layer may be used to visualize and/or display severity interactions between road actors and the AV 102*a*, and/or visualize and/or display relevancy statistics for road actors. For example, according to some aspects, the visualization layer may include, generate, and/or communicate with a user interface that displays and/or outputs relevancy and/or severity information for any object and/or road actor.

Figure 12:
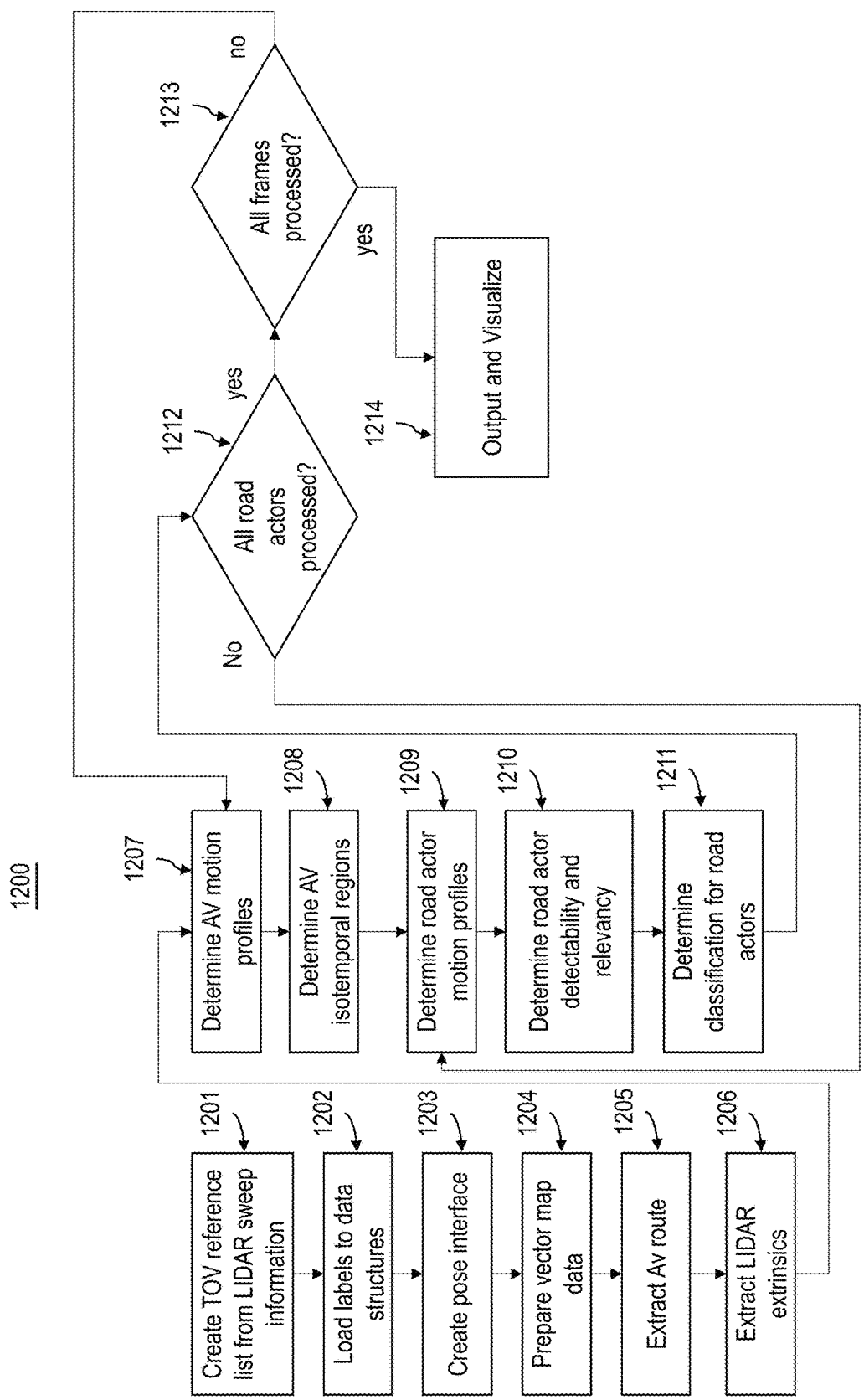
FIG. 12 shows a flowchart of an example method for determining objects affecting a trajectory of a vehicle, in accordance with aspects of the disclosure.

FIG. 12 shows a flowchart of an example method 400 determining perceptual relevancy of objects and/or road actors, according to some aspects. Method 1200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 12, as will be understood by a person of ordinary skill in the art.

Method 1200 shall be described with reference to FIGS. 1-11. However, method 1200 is not limited to the aspects of those figures. The on-board computing device 113 (e.g., the perception module 120, etc.) may facilitate detection and/or determination of objects and/or road actors kinematically capable, even if non-compliant with rules-of-the-road, of affecting a trajectory of a vehicle.

In 1201, on-board computing device 113 creates a time of validity (TOV) reference list from lidar sweep messages. According to some aspects, the lidar sweep messages may be based on pre-defined intervals, such as 0.1 seconds and/or the like. The lidar sweep messages may provide 360-degree sensing information relative to an autonomous vehicle (AV) to which it is associated. The on-board computing device 113 may use any method to create a TOV reference list.

In 1202, on-board computing device 113 loads labels to data structures sensed by a sensor (e.g., lidar sensor, the sensor system 111, etc.). According to some aspects, the on-board computing device 113 may determine the labels from ground truth information provided to the on-board computing device 113, for example, via the database 11 and/or the like. The on-board computing device 113 may use any method to associate labels with data structures.

In 1203, on-board computing device 113 creates and/or generates a pose interface. According to some aspects, the pose interface may display and/or represent a pose (e.g., orientation, etc.) for the AV and/or any sensed objects/actors. The on-board computing device 113 may use any method to generate a pose interface and/or determine a pose of the AV and/or road actors.

In 1204, on-board computing device 113 prepares vector map data. According to some aspects, vector map data may be sent to the on-board computing device 113, for example, by a remote computing device (e.g., remote computing device 110, etc.) and/or the like. According to some aspects, the on-board computing device 113 may be preconfigured with the vector map data, and/or the vector map data (or portions thereof) may be extracted from a database associated with the AV and/or a third-party source. According to some aspects, the vector map data may include polygons, lines, and points which make up all the features on a map describing the drivable area. For example, the vector map data may provide representation and/or description of a drivable area for the AV and/or lane segment information for any road/street within the drivable area. The on-board computing device 113 may use any method to prepare vector map data.

In 1205, on-board computing device 113 determines a route for the AV. According to some aspects, computing device 113 may extract the route for the AV from log data stored by the on-board computing device 113. According to some aspects, the route for the AV may be sent to the on-board computing device 113, for example, by a remote computing device (e.g., remote computing device 110, etc.) and/or the like. The on-board computing device 113 may use any method to determine the route for the AV.

In 1306, on-board computing device 113 determines sensor data. For example, the on-board computing device 113 may extract sensor data such as lidar extrinsic data from logs received from a sensor (e.g., lidar sensor, the sensor system 111, etc.). According to some aspects, lidar extrinsic data may include rotation and translation matrices needed to transform/project 3D cuboids to a lidar frame. The on-board computing device 113 may use any method to determine data needed to transform/project 3D cuboids to any reference frame.

In 1207, on-board computing device 113 determines motion profiles for the AV. The motion profiles may include acceleration and deceleration trajectories for the AV. Acceleration and deceleration trajectories for the AV may include longitudinal trajectories between a current speed of the AV and a target speed (e.g., a lane segment speed, etc.) within a drivable area. Acceleration and deceleration trajectories for the AV may be determined and/or depicted for various time intervals, such as four-second look-ahead time intervals and/or the like. The on-board computing device 113 may use any method to determine motion profiles for the AV.

In 1208, on-board computing device 113 determines isotemporal regions for the AV. The on-board computing device 113 may determine isotemporal regions for the AV by discretizing the motion profiles for the AV along the AV route at set time intervals, such as one-second intervals and/or the like. The on-board computing device 113 may use any method to determine isotemporal regions for the AV.

In 1209, on-board computing device 113 determines motion profiles for road actors. For road actors that pass a detectability check, the on-board computing device 113 may generate deceleration and acceleration (including maintaining lane speed) trajectories to model the behavior of the road actors in the next four seconds. According to some aspects, the direction of both acceleration and deceleration trajectories are limited by lateral acceleration and minimum turning radii of the road actors. Acceleration trajectories may simulate driving maneuvers of the road actors such as u-turns, left-turns, and/or right turns. The on-board computing device 113 may use any method to determine motion profiles for road actors.

In 1210, on-board computing device 113 determines road actor detectability. The on-board computing device 113 may determine a detectability value (occlusion percentage) for each road actor and perform a thresholding operation to determine if a road object or actor is detectable or not. According to some aspects, the thresholding operation may determine and consider how much (e.g., percentage, etc.) of a road actor is occluded, what occludes the road actor, the motion profile of the road actor, and/or the like. Detectability values that satisfy (e.g., meet, exceed, etc.) a detectability threshold may be considered relevant. Detectability values that do not satisfy (e.g., are less than, etc.) a detectability threshold may be considered not relevant.

For example, a road actor such as a large vehicle may be assigned a threshold satisfying detectability value and be considered relevant because the large vehicle is not occluded, is moving at a speed within a drivable area. A road actor such as a small vehicle may be assigned a threshold satisfying detectability value and be considered relevant because the small vehicle is 80% occluded, but moving at a speed within a drivable area. A road actor may be assigned a detectability value that does not satisfy a detectability threshold and be considered not relevant because the road actor is 2% occluded, but not moving at a speed within a drivable area. The on-board computing device 113 may use any method to determine road actor detectability.

In 1211, on-board computing device 113 assigns and/or determines a classification for road actors determined to be relevant. The on-board computing device 113 may determine a classification (e.g., an indication of severity, relevancy, etc.) for detected road actors. For example, severity may be assigned to each detected road actor by determining, based on the respective motion profiles, road actors with trajectories that intersect an isotemporal polygon representation of the AV. According to some aspects, a severity ranking may be based on the type of AV, the type of road actor, the velocity of the AV and/or road actor, a collision point, and/or any other criteria. According to some aspects, the criteria for severity may be user-determined, predefined, updated/modified, determined by a predictive model and/or AI of the on-board computing device 113, and/or the like. The on-board computing device 113 may use any method to determine a classification for road actors determined to be relevant.

In 1212, on-board computing device 113 determines if all road actors have been processed. The on-board computing device 113 may determine if each road actor determined to be relevant has been assigned a severity. For example, the on-board computing device 113 may determine if the number of road actors assigned a severity corresponds to the number of road actors deemed relevant. If the number of road actors assigned a severity does not correspond to the number of road actors deemed relevant, the process may return to step 1209. If the number of road actors assigned a severity corresponds to the number of road actors deemed relevant, the process progresses to 1208.

In 1213, on-board computing device 113 determines if all frames (e.g., TOV list entries, etc.) have been processed. The on-board computing device 113 determines each frame received with sensor data. For example, each frame may correspond to a TOV of a lidar sweep message. The on-board computing device 113 may determine if each lidar sweep message has been processed. If each lidar sweep message has not been processed, the process may return to step 1207. If each lidar sweep message has been processed, the process progresses to 1214.

In 1214, on-board computing device 113 outputs the relevancy and/or severity for all road actors, and enables visualization of each considered scenario for determining the relevancy and/or severity for all road actors. For example, the on-board computing device 113 may include a user interface that enables visualization of the relevancy and/or severity for all road actors and enables visualization of each considered scenario for determining the relevancy and/or severity for all road actors. The on-board computing device 113 may output/send one or more data files, API calls, and/or the like that enable another device to cause display of the relevancy and/or severity for all road actors, and enables another device to cause display of each considered scenario for determining the relevancy and/or severity for all road actors.

Figure 13:
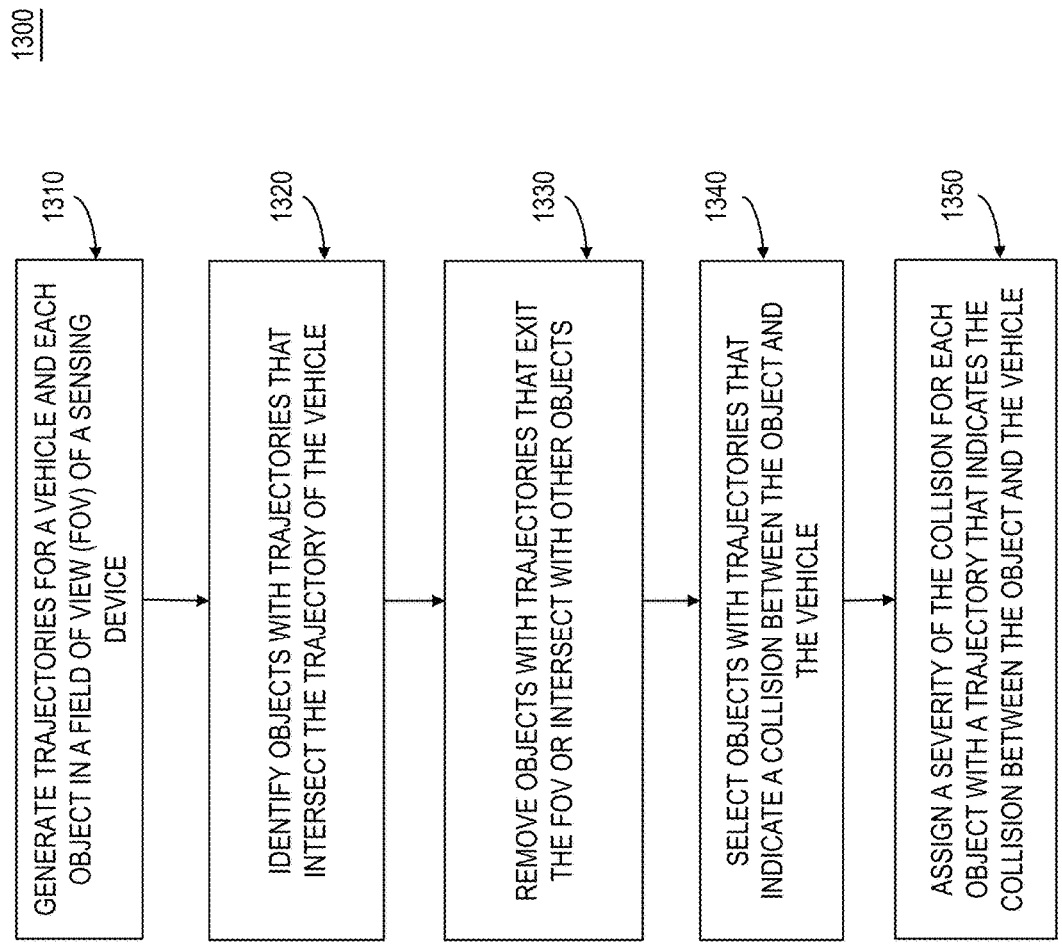
FIG. 13 shows a flowchart of another example method for determining objects affecting a trajectory of a vehicle, in accordance with aspects of the disclosure.

FIG. 13 shows a flowchart of an example method 1300 determining objects (e.g., spatially relevant objects, etc.) that are kinematically capable, even if non-compliant with rules-of-the-road, of affecting a trajectory of a vehicle, according to some aspects. Method 1300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 13, as will be understood by a person of ordinary skill in the art.

Method 1300 shall be described with reference to FIGS. 1-12. However, method 1300 is not limited to the aspects of those figures. The on-board computing device 113 (e.g., the perception module 120, etc.) may facilitate identifying, detecting, and/or determining objects (e.g., spatially relevant objects, etc.) that are kinematically capable, even if non-compliant with rules-of-the-road, of affecting a trajectory of a vehicle.

In 1310, on-board computing device 113 generates and/or determines a trajectory for a vehicle and a respective trajectory for each object of a plurality of objects within a field of view (FOV) of a sensing device associated with the vehicle. The on-board computing device 113 may receive sensor information from the sensing device. The sensing device may include at least one of a Light Detection and Ranging (lidar) sensing device, an ultrasonic sensing device, a depth-sensing device, a Radio Detection and Ranging (RADAR) device, or a camera. The on-board computing device 113 may identify, detect, and/or determine, based on the sensor information, each object of the plurality of objects within the FOV. For example, each object of the plurality of objects within the FOV may satisfy a perception threshold that indicates an amount of an object sensed by the sensing device that is occluded by an item.

The on-board computing device 113 may generate and/or determine the trajectory for a vehicle and a respective trajectory for each object of a plurality of objects within the FOV of the sensing device based on the sensor information. For example, for the vehicle and each object of the plurality of objects, the sensor information may indicate a respective position and a respective velocity. According to some aspects, the respective position and the respective velocity may be determined and/or identified by a perception system, received from a source (e.g., the remote computing device 110, etc.), and/or received from a ground truth human labeling system with offline processing. Generating and/or determining the trajectory for the vehicle and the respective trajectories for each object of the plurality of objects may be based on the respective positions and the respective velocities. According to some aspects, the trajectory for the vehicle and the respective trajectories for each object of the plurality of objects may include constraints based on an object or actor type, such as maximum speed, maximum acceleration, maximum jerk, turning radius, etc.

In 1320, on-board computing device 113 identifies and/or determines objects of the plurality of objects with trajectories that intersect the trajectory for the vehicle. The on-board computing device 113 may identify and/or determine objects of the plurality of objects with trajectories that intersect the trajectory for the vehicle based on the respective trajectories for each object of the plurality of objects.

In 1330, on-board computing device 113 removes, from the objects with trajectories that intersect the trajectory for the vehicle, objects with trajectories that at least one of exit the FOV or intersect with other objects of the plurality of objects within the FOV.

In 1340, on-board computing device 113 selects and/or determines, from remaining objects with trajectories that intersect the trajectory for the vehicle, objects with trajectories that indicate a respective collision between the object and the vehicle.

In 1350, on-board computing device 113 assigns and/or determines, for each object of the objects with the trajectories that indicate the respective collision between the object and the vehicle, a severity of the respective collision. Assigning and/or determining, for each object of the objects with the trajectories that indicate the respective collision, the severity of the respective collision may include inputting, into a predictive model, a velocity of the vehicle, a velocity for the object, and an object type for the object. The on-board computing device 113 may receive from the predictive model, based on the velocity of the vehicle, a position of the vehicle, the velocity for the object, and the object type, an indication of the severity of the respective collision.

According to some aspects, method 1300 may further include the on-board computing device 113 causing, for each object of the objects with the trajectories that indicate the respective collision between the object and the vehicle, display of the respective trajectory and the trajectory for the vehicle. According to some aspects, method 1300 may further include the on-board computing device 113 sending, to a user device, an indication of the severity of the respective collision for each object of the objects with the trajectories that indicate the respective collision between the object and the vehicle.

According to some aspects, method 1300 may further include the on-board computing device 113 causing the vehicle to perform a driving maneuver. The on-board computing device 113 may cause the vehicle to perform a driving maneuver based on the severity of the respective collision for at least one object of the objects with the trajectories that indicate the respective collision. For example, on-board computing device 113 may cause the vehicle to brake, turn, accelerate, decelerate, and/or execute any other maneuver to avoid the respective collision when the severity of the respective collision satisfies a threshold. According to some aspects, the on-board computing device 113 may cause the vehicle to brake, turn, accelerate, decelerate, and/or execute any other maneuver to avoid the respective collision when the severity of the respective collision satisfies a threshold while also causing the vehicle to maneuver in a manner that avoids another collision.

Figure 14:
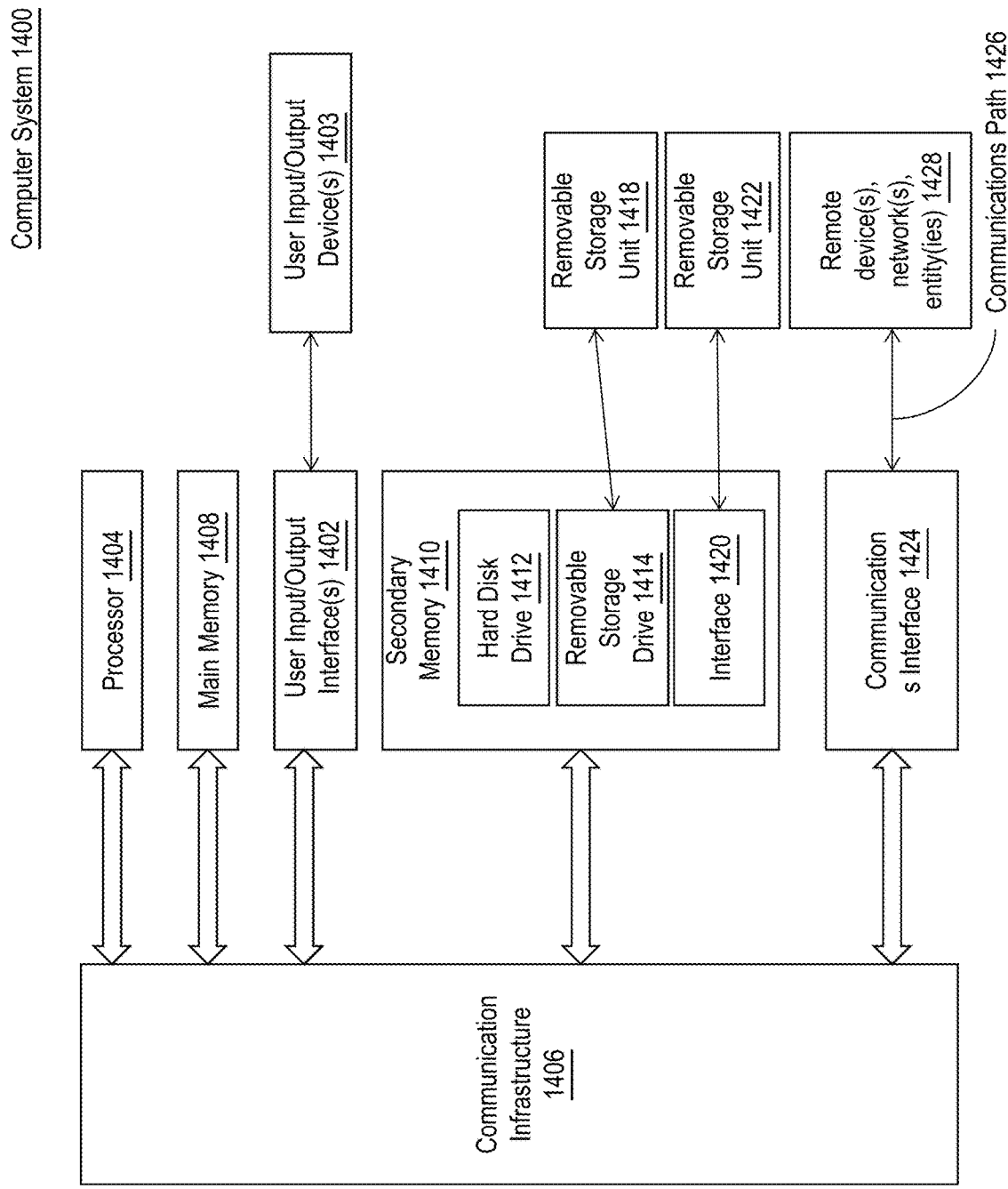
FIG. 14 is an example computer system useful for implementing various aspects of the disclosure.

Various embodiments can be implemented, for example, using one or more computer systems, such as computer system 1400 shown in FIG. 14. Computer system 1400 can be any computer capable of performing the functions described herein.

Computer system 1400 can be any well-known computer capable of performing the functions described herein. According to some aspects, the on-board computing device 113 of FIG. 1 (and/or any other device/component described herein) may be implemented using the computer system 1400. According to some aspects, the computer system 1400 may be used and/or specifically configured to implement methods 1200 and 1300.

Computer system 1400 includes one or more processors (also called central processing units, or CPUs), such as a processor 1404. Processor 1404 is connected to a communication infrastructure or bus 1406.

One or more processors 1404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 also includes user input/output device(s) 1403, such as monitors, keyboards, pointing devices, etc., that communicate with communication infrastructure 1406 through user input/output interface(s) 1402.

Computer system 1400 also includes a main or primary memory 1408, such as random access memory (RAM). Main memory 1408 may include one or more levels of cache. Main memory 1408 has stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, a tape backup device, and/or any other storage device/drive.

Removable storage drive 1414 may interact with a removable storage unit 1418. Removable storage unit 1418 includes a computer-usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary embodiment, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired and/or wireless, and which may include any combination of LANs, WANs, the Internet, etc. Control logic and/or data may be transmitted to and from computer system 1400 via communication path 1426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 14. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
generating, by one or more computing devices of a vehicle, based on sensor information received from a sensing device associated with the vehicle, a trajectory for the vehicle and a respective trajectory for each object of a plurality of objects within a field of view (FOV) of the sensing device;
identifying, based on the respective trajectories for each object of the plurality of objects, objects of the plurality of objects with trajectories that intersect the trajectory for the vehicle;
removing, from the objects with trajectories that intersect the trajectory for the vehicle, objects with trajectories that intersect with other objects of the plurality of objects within the FOV;
selecting, from remaining objects with trajectories that intersect the trajectory for the vehicle, objects with trajectories that indicate a respective collision between the object and the vehicle;
assigning, for each object of the objects with the trajectories that indicate the respective collision between the object and the vehicle, a severity of the respective collision; and
causing, based on the severity of the respective collision for at least one object of the objects with the trajectories that indicate the respective collision, the vehicle to perform a driving maneuver.

2. The method of claim 1, further comprising detecting, based on the sensor information, each object of the plurality of objects within the FOV,
wherein each object of the plurality of objects within the FOV satisfies a perception threshold that indicates an amount of an object sensed by the sensing device that is occluded by an item.

3. The method of claim 1, wherein, for the vehicle and each object of the plurality of objects, the sensor information indicates a respective position and a respective velocity, and wherein the generating the trajectory for the vehicle and the respective trajectories for each object of the plurality of objects is based on the respective positions and the respective velocities.

4. The method of claim 1, wherein the assigning, for each object of the objects with the trajectories that indicate the respective collision, the severity of the respective collision comprises:
inputting, into a predictive model, a velocity of the vehicle, a position of the vehicle, a velocity for the object, and an object type for the object; and
receiving from the predictive model, based on the velocity of the vehicle, the position of the vehicle, the velocity for the object, and the object type, an indication of the severity of the respective collision.

5. The method of claim 1, further comprising causing, for each object of the objects with the trajectories that indicate the respective collision between the object and the vehicle, display of the respective trajectory and the trajectory for the vehicle.

6. The method of claim 1, further comprising sending, to a user device, an indication of the severity of the respective collision for each object of the objects with the trajectories that indicate the respective collision between the object and the vehicle.

7. A computing system comprising:
a memory of a vehicle configured to store instructions;
a processor of the vehicle, coupled to the memory, configured to process the stored instructions to:
generate, based on sensor information received from a sensing device associated with a vehicle, a trajectory for the vehicle and a respective trajectory for each object of a plurality of objects within a field of view (FOV) of the sensing device;
identify, based on the respective trajectories for each object of the plurality of objects, objects of the plurality of objects with trajectories that intersect the trajectory for the vehicle;
remove, from the objects with trajectories that intersect the trajectory for the vehicle, objects with trajectories that intersect with other objects of the plurality of objects within the FOV;
select, from remaining objects with trajectories that intersect the trajectory for the vehicle, objects with trajectories that indicate a respective collision between the object and the vehicle;
assign, for each object of the objects with the trajectories that indicate the respective collision between the object and the vehicle, a severity of the respective collision; and
cause, based on the severity of the respective collision for at least one object of the objects with the trajectories that indicate the respective collision, the vehicle to perform a driving maneuver.

8. The system of claim 7, the processor further configured to detect, based on the sensor information, each object of the plurality of objects within the FOV,
wherein each object of the plurality of objects within the FOV satisfies a perception threshold that indicates an amount of an object sensed by the sensing device that is occluded by an item.

9. The system of claim 7, wherein, for the vehicle and each object of the plurality of objects, the sensor information indicates a respective position and a respective velocity, and the processor configured to generate the trajectory for the vehicle and the respective trajectories for each object of the plurality of objects is further configured to generate the trajectory for the vehicle and the respective trajectories for each object of the plurality of objects based on the respective positions and the respective velocities.

10. The system of claim 7, the processor configured to assign, for each object of the objects with the trajectories that indicate the respective collision, the severity of the respective collision is further configured to:
- input, into a predictive model, a velocity of the vehicle, a position of the vehicle, a velocity for the object, and an object type for the object; and
- receive from the predictive model, based on the velocity of the vehicle, the position of the vehicle, the velocity for the object, and the object type, an indication of the severity of the respective collision.

11. The system of claim 7, the processor further configured to cause, for each object of the objects with the trajectories that indicate the respective collision between the object and the vehicle, display of the respective trajectory and the trajectory for the vehicle.

12. The system of claim 7, the processor further configured to send, to a user device, an indication of the severity of the respective collision for each object of the objects with the trajectories that indicate the respective collision between the object and the vehicle.

13. A non-transitory computer-readable medium having instructions stored thereon that, when executed by at least one computing device, cause the at least one computing device to perform operations comprising:
- generating, based on sensor information received from a sensing device associated with a vehicle, a trajectory for the vehicle and a respective trajectory for each object of a plurality of objects within a field of view (FOV) of the sensing device;
- identifying, based on the respective trajectories for each object of the plurality of objects, objects of the plurality of objects with trajectories that intersect the trajectory for the vehicle;
- removing, from the objects with trajectories that intersect the trajectory for the vehicle, objects with trajectories that intersect with other objects of the plurality of objects within the FOV;
- selecting, from remaining objects with trajectories that intersect the trajectory for the vehicle, objects with trajectories that indicate a respective collision between the object and the vehicle;
- assigning, for each object of the objects with the trajectories that indicate the respective collision between the object and the vehicle, a severity of the respective collision; and
- causing, based on the severity of the respective collision for at least one object of the objects with the trajectories that indicate the respective collision, the vehicle to perform a driving maneuver.

14. The non-transitory computer-readable medium claim 13, further comprising detecting, based on the sensor information, each object of the plurality of objects within the FOV,
- wherein each object of the plurality of objects within the FOV satisfies a perception threshold that indicates an amount of an object sensed by the sensing device that is occluded by an item.

15. The non-transitory computer-readable medium claim 13, wherein, for the vehicle and each object of the plurality of objects, the sensor information indicates a respective position and a respective velocity, and wherein the generating the trajectory for the vehicle and the respective trajectories for each object of the plurality of objects is based on the respective positions and the respective velocities.

16. The non-transitory computer-readable medium claim 13, wherein the assigning, for each object of the objects with the trajectories that indicate the respective collision, the severity of the respective collision comprises:
- inputting, into a predictive model, a velocity of the vehicle, a position of the vehicle, a velocity for the object, and an object type for the object; and
- receiving from the predictive model, based on the velocity of the vehicle, the position of the vehicle, the velocity for the object, and the object type, an indication of the severity of the respective collision.

17. The non-transitory computer-readable medium claim 13, further comprising causing, for each object of the objects with the trajectories that indicate the respective collision between the object and the vehicle, display of the respective trajectory and the trajectory for the vehicle.

18. The non-transitory computer-readable medium claim 13, further comprising sending, to a user device, an indication of the severity of the respective collision for each object of the objects with the trajectories that indicate the respective collision between the object and the vehicle.

* * * * *